United States Patent
Vo et al.

(10) Patent No.: US 9,499,735 B2
(45) Date of Patent: Nov. 22, 2016

(54) CONSOLIDATING COMPOSITION FOR TREATMENT OF A SUBTERRANEAN FORMATION

(71) Applicant: Halliburton Energy Services, Inc., Houston, TX (US)

(72) Inventors: Loan K. Vo, Houston, TX (US); Philip D. Nguyen, Houston, TX (US); Christopher Parton, Humber, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 49 days.

(21) Appl. No.: 14/442,461

(22) PCT Filed: Jul. 9, 2014

(86) PCT No.: PCT/US2014/045898
§ 371 (c)(1),
(2) Date: May 13, 2015

(87) PCT Pub. No.: WO2016/007149
PCT Pub. Date: Jan. 14, 2016

(65) Prior Publication Data
US 2016/0272872 A1    Sep. 22, 2016

(51) Int. Cl.
*C09K 8/035* (2006.01)
*C09K 8/56* (2006.01)
(Continued)

(52) U.S. Cl.
CPC .............. *C09K 8/56* (2013.01); *C09K 8/035* (2013.01); *C09K 8/426* (2013.01); *C09K 8/44* (2013.01);
(Continued)

(58) Field of Classification Search
None
See application file for complete search history.

(56) References Cited

U.S. PATENT DOCUMENTS

| 4,891,399 A | 1/1990 | Ohkawa et al. |
| 6,705,400 B1 | 3/2004 | Nguyen et al. |

(Continued)

FOREIGN PATENT DOCUMENTS

WO    WO-2008147658 A1    12/2008

OTHER PUBLICATIONS

"International Application Serial No. PCT/US2014/045898, International Search Report mailed Apr. 9, 2015", 4 pgs.
(Continued)

*Primary Examiner* — John J Figueroa
(74) *Attorney, Agent, or Firm* — Schwegman Lundberg & Woessner, P.A.; Craig W. Roddy

(57) ABSTRACT

Various embodiments disclosed relate to compositions for treating a subterranean formation and methods of using same, such as for consolidation. In various embodiments, the present invention provides a method of treating a subterranean formation, the method including obtaining or providing a composition. The composition includes an aryl component including at least one of an aryldicarboxylic acid, an ester thereof, a salt thereof, and an acid halide thereof. The composition includes an amine or epoxide component that includes at least one of component A and component B. Component A is a linear diepoxide, a poly (alkylamine), or a combination thereof. Component B is an alkoxy- or hydroxy-substituted silane including an epoxy group, an alkoxy- or hydroxy-substituted silane including an amine group, or a combination thereof. The method also includes placing the composition in a subterranean formation.

19 Claims, 3 Drawing Sheets

(51) Int. Cl.
*C09K 8/44* (2006.01)
*C09K 8/42* (2006.01)
*E21B 33/138* (2006.01)
*E21B 43/04* (2006.01)
*E21B 43/267* (2006.01)
*E21B 43/26* (2006.01)

(52) U.S. Cl.
CPC .............. *E21B 33/138* (2013.01); *E21B 43/04* (2013.01); *E21B 43/26* (2013.01); *E21B 43/267* (2013.01)

(56) References Cited

U.S. PATENT DOCUMENTS

| | | | |
|---|---|---|---|
| 6,729,404 B2 | 5/2004 | Nguyen et al. | |
| 6,962,200 B2 | 11/2005 | Nguyen et al. | |
| 7,114,570 B2 | 10/2006 | Nguyen et al. | |
| 7,264,052 B2 | 9/2007 | Nguyen et al. | |
| 9,206,345 B2 * | 12/2015 | Weaver | C09K 8/506 |
| 2002/0119263 A1 | 8/2002 | Abe | |
| 2008/0302570 A1 | 12/2008 | DeBoer | |
| 2010/0282462 A1 | 11/2010 | Xu et al. | |
| 2013/0209868 A1 | 8/2013 | Suzuta et al. | |
| 2013/0310283 A1 | 11/2013 | Athey | |
| 2014/0357535 A1 * | 12/2014 | Tang | C09K 8/805 507/219 |
| 2015/0034314 A1 * | 2/2015 | Hudson | C09K 8/805 166/276 |
| 2016/0208157 A1 * | 7/2016 | Vo | C09K 8/035 |

OTHER PUBLICATIONS

"International Application Serial No. PCT/US2014/045898, Written Opinion mailed Apr. 9, 2015", 6 pgs.

* cited by examiner

CONSOLIDATING COMPOSITION FOR TREATMENT OF A SUBTERRANEAN FORMATION

BACKGROUND OF THE INVENTION

The presence of the particulate matter, such as sand, in produced fluids from hydrocarbon wells can be problematic. For example, particulates can abrade pumping and other production equipment and reduce the fluid production capabilities of the producing zones. Hydrocarbon wells are often located in subterranean zones that contain unconsolidated particulate matter that can migrate out of the well along with oil, gas, water, or other fluids produced by the well. Placing proppant downhole during hydraulic fracturing operations can result in unconsolidated proppant that can become entrained with produced fluids.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Figure 1:
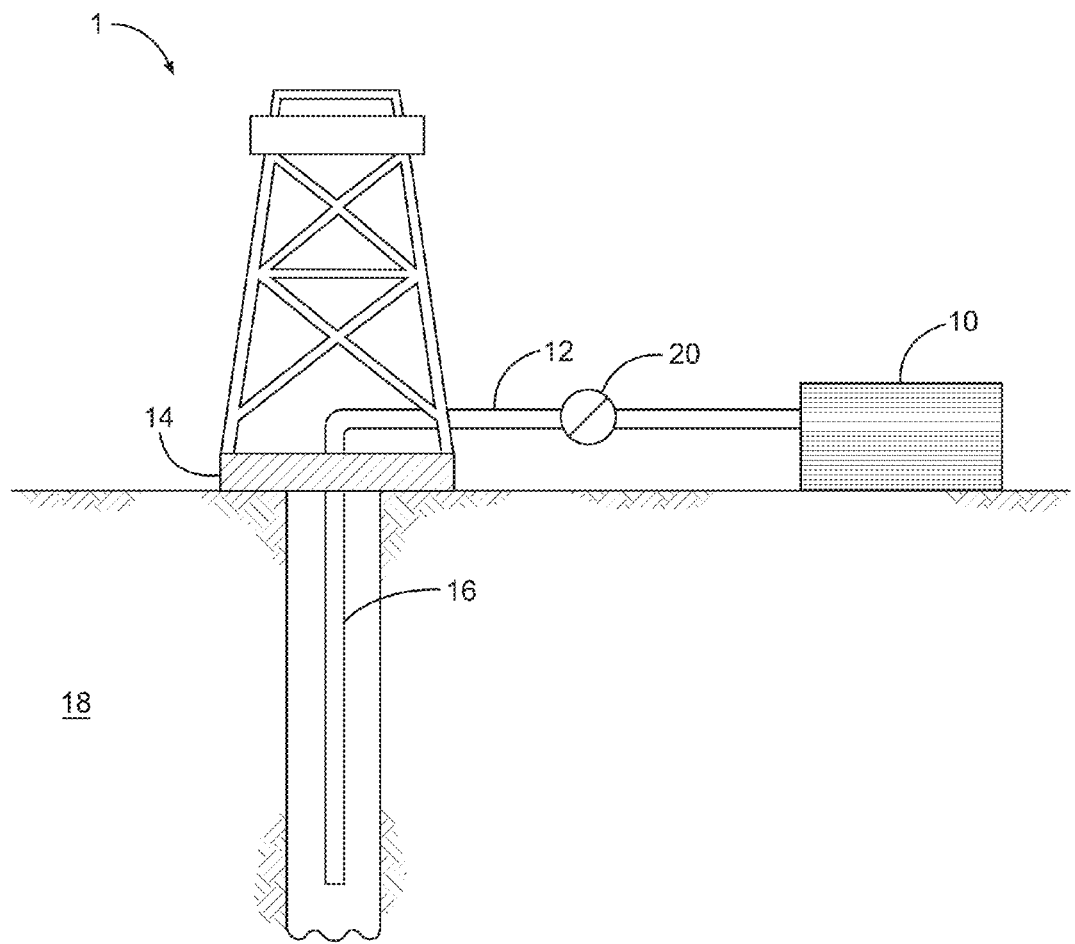
FIG. 1 illustrates a system or apparatus for delivering a composition to a subterranean formation, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C (S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing 3 or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C$_2$-heterocyclyl can be a 5-ring with two carbon atoms and three heteroatoms, a 6-ring with two carbon atoms and four heteroatoms and so forth. Likewise a C$_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packing fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, the present invention provides a method of treating a subterranean formation. The method includes obtaining or providing a composition. The composition includes an aryl component including at least one of an aryldicarboxylic acid, an ester thereof, a salt thereof, and an acid halide thereof. The composition includes an amine or epoxide component that includes at least one of components A and B. Component A is a linear diepoxide, a poly(alkylamine), or a combination thereof. Component B is an alkoxy- or hydroxy-substituted silane including an epoxy group, an alkoxy- or hydroxy-substituted silane including an amine group, or a combination thereof. The method also includes placing the composition in a subterranean formation.

In various embodiments, the present invention provides a method of treating a subterranean formation. The method includes obtaining or providing a composition. The composition includes about 0.001 wt % to about 50 wt % of an aryl component having the following structure:

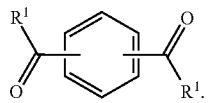

The variable $R^1$ is selected from the group consisting of —OH, —OR$^2$, —O$^-$[counterion], and -halide, wherein at each occurrence $R^2$ is a substituted or unsubstituted ($C_1$-$C_{30}$)hydrocarbyl interrupted by 0, 1, 2, or 3 groups selected from —O—, substituted or unsubstituted —NH—, and —S—. The composition includes about 0.001 wt % to about 50 wt % of an amine or epoxide component including at least one of components A and B. Component A is a linear diepoxide, a poly(alkylamine), or a combination thereof. The linear diepoxide has the following structure:

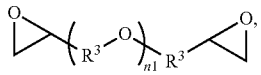

At each occurrence $R^3$ is independently a substituted or unsubstituted ($C_1$-$C_{30}$)hydrocarbylene. The variable n1 is about 0 to about 100,000. The poly(alkylamine) has the following structure:

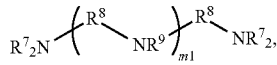

At each occurrence, $R^7$ is selected from the group consisting of —H and a substituted or unsubstituted ($C_1$-$C_{30}$)hydrocarbyl. At each occurrence, $R^8$ is a substituted or unsubstituted ($C_1$-$C_{30}$)hydrocarbylene. At each occurrence, $R^9$ is selected from the group consisting of —H, a substituted or unsubstituted ($C_1$-$C_{30}$)hydrocarbyl, and a substituted or unsubstituted ($C_1$-$C_{30}$)hydrocarbylene terminated with —NR$^9_2$. The variable m1 is about 0 to about 100,000. Component B is an alkoxy- or hydroxy-substituted silane including an epoxy group, an alkoxy- or hydroxy-substituted silane including an amine group, or a combination thereof. The alkoxy- or hydroxy-substituted silane including an epoxy group has the structure:

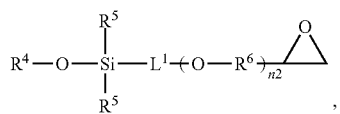

The variable $R^4$ is independently selected from the group consisting of —H and a substituted or unsubstituted ($C_1$-$C_{30}$)hydrocarbyl interrupted by 0, 1, 2, or 3 groups independently chosen from —O— and —S—. At each occurrence, $R^5$ is independently selected from the group consisting of a substituted or unsubstituted ($C_1$-$C_{30}$)hydrocarbyl interrupted by 0, 1, 2, or 3 groups independently chosen from —O— and —S—, and a substituted or unsubstituted ($C_1$-$C_{30}$)hydrocarbyloxy interrupted by 0, 1, 2, or 3 groups independently chosen from —O— and —S—. At each occurrence, $R^6$ is independently a substituted or unsubstituted ($C_1$-$C_{30}$)hydrocarbylene. The variable $L^1$ is a substituted or unsubstituted ($C_1$-$C_{30}$)hydrocarbylene. The variable n2 is about 0 to about 100,000. The alkoxy- or hydroxy-substituted silane including the amine group has the structure:

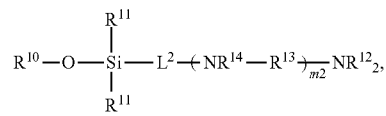

The variable $R^{10}$ is independently selected from the group consisting of —H and a substituted or unsubstituted ($C_1$-$C_{30}$)hydrocarbyl interrupted by 0, 1, 2, or 3 groups independently chosen from —O—, substituted or unsubstituted —NH—, and —S—. At each occurrence, $R^{11}$ is independently selected from the group consisting of a substituted or unsubstituted ($C_1$-$C_{30}$)hydrocarbyl interrupted by 0, 1, 2, or 3 groups independently chosen from —O— and —S—, and a substituted or unsubstituted ($C_1$-$C_{30}$)hydrocarbyloxy interrupted by 0, 1, 2, or 3 groups independently chosen from —O— and —S—. The variable $R^{12}$ is selected from the group consisting of —H and a substituted or unsubstituted ($C_1$-$C_{30}$)hydrocarbyl. The variable $R^{13}$ is a substituted or unsubstituted ($C_1$-$C_{30}$)hydrocarbylene. The variable $R^{14}$ is selected from the group consisting of —H, a substituted or unsubstituted ($C_1$-$C_{30}$)hydrocarbyl, and a substituted or unsubstituted ($C_1$-$C_{30}$)hydrocarbylene terminated with —NR$^{14}_2$. The variable $L^2$ is a substituted or unsubstituted ($C_1$-$C_{30}$)hydrocarbylene. The variable m2 is about 0 to about 100,000. The method includes placing the composition in a subterranean formation.

In various embodiments, the present invention provides a system including a composition. The composition includes an aryl component including at least one of an aryldicarboxylic acid, an ester thereof, a salt thereof, and an acid halide thereof. The composition includes an amine or epoxide component including at least one of component A and B. Component A is a linear diepoxide, a poly(alkylamine), or a combination thereof. Component B is an alkoxy- or hydroxy-substituted silane including an epoxy group, an alkoxy- or hydroxy-substituted silane including an amine group, or a combination thereof. The system includes a subterranean formation including the composition therein.

In various embodiments, the present invention provides a composition for treatment of a subterranean formation. The composition includes an aryl component including at least one of an aryldicarboxylic acid, an ester thereof, a salt thereof, and an acid halide thereof. The composition includes an amine or epoxide component including at least one of components A and B. Component A is a linear diepoxide, a poly(alkylamine), or a combination thereof. Component B is an alkoxy- or hydroxy-substituted silane including an epoxy group, an alkoxy- or hydroxy-substituted silane including an amine group, or a combination thereof.

In various embodiments, the present invention provides a method of preparing a composition for treatment of a subterranean formation. The method includes forming a composition. The composition includes an aryl component including at least one of an aryldicarboxylic acid, an ester thereof, a salt thereof, and an acid halide thereof. The composition includes an amine or epoxide component including at least one of components A and B. Component A is a linear diepoxide, a poly(alkylamine), or a combination thereof. Component B is an alkoxy- or hydroxy-substituted silane including an epoxy group, an alkoxy- or hydroxy-substituted silane including an amine group, or a combination thereof.

Various embodiments of the present invention provide certain advantages over other compositions and methods for consolidation, at least some of which are unexpected. In various embodiments, the bonding provided between particulates by the cured product of the composition is stronger and more resilient toward stress effects that can occur downhole. The increased strength and resiliency can increase the effectiveness of the consolidation and provide production liquids having reduced particulate content for longer periods of time and at a higher rate. In various embodiments, the composition can be less expensive than other consolidating compositions, providing a greater amount of consolidation for a given cost than other consolidating compositions.

In some embodiments, the composition can bond with particulate surfaces, such as proppant or sand, forming a more effective consolidation. In some embodiments, by appropriately modifying the structure of the aryl compound or the amine or epoxide component, the properties of the curing process of the composition can be tuned to specific desired parameters, such as the solubility of each component, speed of the cure under various conditions, and properties of the cured product like strength, stiffness, and flexibility. In various embodiments proppant is pre-coated with the composition, while other embodiments provide on-the-fly application of the composition to a proppant during hydraulic treatment.

Method of Treating a Subterranean Formation.

In some embodiments, the present invention provides a method of treating a subterranean formation. The method includes obtaining or providing a composition including an aryl component and an amine or epoxide component. The composition can be or can include a consolidating resin. In various embodiments, the composition can be used in well completion operations, such as primary proppant treatments for immobilizing proppant particulates (e.g., hydraulic fracturing, gravel packing, and frac-packing), remedial proppant/gravel treatments, near-wellbore formation sand consolidation treatments for sand control, consolidating-while-drilling target intervals, and plugging-and-abandonment of wellbores in subterranean formations.

The obtaining or providing of the composition can occur at any suitable time and at any suitable location. The obtaining or providing of the composition can occur above the surface. The obtaining or providing of the composition can occur in the subterranean formation (e.g., downhole). The method also includes placing the composition in a subterranean formation. The placing of the composition in the subterranean formation can include contacting the composition and any suitable part of the subterranean formation, or contacting the composition and a subterranean material, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a fracture, flow pathway, or area surrounding the same.

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

The method can include at least partially curing the composition, to form a cured product of the composition. In some embodiments, substantially all of the composition is curable, while in other embodiments the composition includes curable components and non-curable components such that only part of the composition is curable. For example, in some embodiments, the composition includes a slurry of proppant particles in a carrier fluid, wherein the proppant particles are coated with curable components but the carrier fluid is substantially non-curable. The curable components of the composition can be a curable resin. In some embodiments, the curable components of the composition can be about 0.001 wt % to about 99.999 wt % of the composition, or about 0.1 wt % to about 80 wt %, or about 1 wt % to about 50 wt %, or about 1 wt % or more of the composition, or about 2 wt %, 3, 4, 5, 10, 15, 20, 25, 30, 40, 50, 60, 70, 80, 85, 90, 91, 92, 93, 94, 95, 96, 97, 98, 99, 99.9, or about 99.99 wt % or more. In some embodiments, the curing can include curing about 1 wt % or more of the curable components, or about 2 wt %, 3, 4, 5, 10, 15, 20, 25, 30, 40, 50, 60, 70, 80, 85, 90, 91, 92, 93, 94, 95, 96, 97, 98, 99, 99.9, or about 99.99 wt % or more of the curable components of the composition. The curing can occur at any suitable location, such as at the surface, during transport downhole, at a downhole location, or a combination thereof. In some embodiments, the composition is allowed to react at least partially above the surface with a gravel or proppant surface to form bonds thereto (e.g., via hydroxy-reactive silicon groups such as alkoxy- or hydroxy-substituted silanes), and the composition is allowed to cure downhole. In some embodiments, reaction with the surface of gravel, proppant, or the subterranean formation can occur at least partially downhole. The curing can be initiated by any suitable conditions, such as pressure, temperature, or by presence of a chemical catalyst or initiator. In some embodiments, the composition can include a base, such as any suitable organic or inorganic base, such as triethylamine, to catalyze the curing process.

Any suitable proportion of the composition can be one or more downhole fluids or one or more carrier liquids. In some embodiments about 0.001 wt % to about 99.999 wt % of the composition can be a downhole fluid or carrier liquid, or about 0.1 wt % to about 80 wt %, or about 1 wt % to about 50 wt %, or about 1 wt % or more of the composition, or about 2 wt %, 3, 4, 5, 10, 15, 20, 25, 30, 40, 50, 60, 70, 80, 85, 90, 91, 92, 93, 94, 95, 96, 97, 98, 99, 99.9, or about 99.99 wt % or more.

In various embodiments, the composition, a cured product thereof, or mixture including the composition or a cured product thereof can include a proppant or gravel. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant or gravel, such as about 0.01 wt % to about 99.99 wt %, about 1 wt % to about 90 wt %, about 5 wt % to about 70 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more. In some embodiments, the composition includes curable components (e.g., the aryl component and the amine or epoxide component, and any other optional curable components) at least partially coated on the proppant or gravel. In some embodiments, the curable components of the composition can form or be part of a liquid that suspends the proppant in a slurry.

In various embodiments, the composition includes the aryl component, the epoxide component, a silane coupling agent, a surfactant for facilitating the coating of the curable components on particulate substrates, and a carrier fluid.

In one embodiment, a method of treating proppant on the fly during the hydraulic fracturing treatment or screenless frac-pack treatment can include: mixing components of the composition together to form a single, homogenous mixture; coating the mixture on the proppant while the proppant is being mixed in a fracturing carrier fluid; injecting the resin-treated proppant slurry into a wellbore to be placed in a generated fracture located in the subterranean formation; allowing the system to cure at formation temperature.

In another embodiment, a method of treating the formation with the composition includes: mixing components of the composition together in a soluble solvent; injecting the mixture into the formation interval that requires treatment; postflushing with a solvent or a gas; allowing the system to cure at formation temperature In one embodiment, the present invention provides a method of treating proppant using a wet coat or on the fly method, such as during a hydraulic fracturing treatment. In another embodiment, the present invention provides a method of dry coating or pretreating the proppant prior to a fracturing treatment, generally including applying a mixture of the aryl component and the amine or epoxide component, and any other optional components of the composition, to the dry proppant.

The method can further include applying a preflush solution to the subterranean formation. The preflush solution can be any suitable preflush solution. For example, the preflush solution can ready the subterranean material to receive the composition and can remove oils that can impede the composition from making contact with particulates that are desired to be consolidated by the composition. The preflush solution can include an aqueous liquid. The aqueous liquid in the preflush solution can include at least one of salt water and brine. The preflush solution can include a surfactant. The surfactant in the preflush solution can include at least one of an ethoxylated nonyl phenol phosphate ester, a cationic surfactant, a non-ionic surfactant, an alkyl phosphonate surfactant, or mixtures thereof.

The method can further include applying an afterflush fluid to the subterranean formation. For example, the afterflush fluid can displace the composition from selected areas of the wellbore to remove the composition from the pore spaces inside the subterranean formation and thereby restore permeability while leaving behind composition at, for example, contact points between the subterranean formation and particulates such that the particulates can be consolidated. The afterflush fluid can be any suitable afterflush fluid, such as at least one of salt water, brine, and nitrogen gas.

Composition Including an Aryl Component and an Amine or Epoxide Component.

The composition includes an aryl component and an amine or epoxide component, or a cured product thereof. The composition can include a combination of an aryl component and an amine or epoxide component, and a cured product of the aryl component and an amine or epoxide component. For example, the composition can include about 0 wt % to about 100 wt % cured composition, or about 0.001 wt % to about 99.999 wt %, or about 0.001 wt % or less, or about 0.01 wt %, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The aryl component can be any suitable proportion of the composition. For example, the aryl component can be about 0.001 wt % to about 50 wt % of the composition, about 0.01 wt % to about 30 wt %, or about 0.001 wt % or less, or about 0.01 wt %, 0.1, 1, 2, 3, 4, 5, 10, 15, 20, 25, 30, 35, 40, 45, or about 50 wt % or more.

The aryl component can be a $(C_6\text{-}C_{40})$aryldicarboxylic acid, ester thereof, salt thereof, or acid halide thereof. In some embodiments, the aryldicarboxylic acid, ester thereof, salt thereof, or acid halide thereof has the following structure:

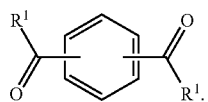

The variable $R^1$ can be selected from the group consisting of —OH, —$OR^2$, —$O^-$[counterion], and -halide, wherein at each occurrence $R^2$ is a substituted or unsubstituted ($C_1$-$C_{30}$)hydrocarbyl interrupted by 0, 1, 2, or 3 groups selected from —O—, substituted or unsubstituted —NH— (e.g., —NH— or —NR— wherein R is a substituent), and —S—. The counterion can be any suitable counterion. The aryldicarboxylic acid or derivative thereof can be para-substituted (e.g., terephthalic acid and derivatives), meta-substituted (e.g., isophthalic acid and derivatives), or ortho-substituted (e.g., phthalic acid and derivatives) with the carboxylic acid group or derivatives thereof.

The aryldicarboxylic acid, ester thereof, salt thereof, or acid halide thereof can have the following structure:

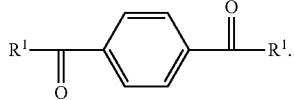

The aryl component can include at least one of:

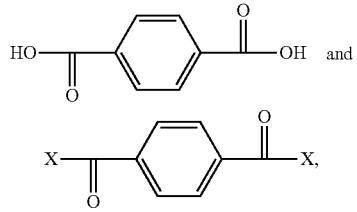

The variable X is a halide.

The amine or epoxide component includes at least one of components A and B. Component A is a linear diepoxide, a poly(alkylamine), or a combination thereof. Component B is an alkoxy- or hydroxy-substituted silane including an epoxy group, an alkoxy- or hydroxy-substituted silane including an amine group, or a combination thereof. Any suitable proportion of the composition can be the amine or epoxide component, such as about 0.001 wt % to about 50 wt % of the composition, about 0.01 wt % to about 30 wt %, or about 0.001 wt % or less, or about 0.01 wt %, 0.1, 1, 2, 3, 4, 5, 10, 15, 20, 25, 30, 35, 40, 45, or about 50 wt % or more.

The linear diepoxide can react to form a cured product with the aryldicarboxylic acid, ester thereof, or salt thereof, and the poly(alkylamide) can react to form a cured product with the aryldicarboxylic acid, ester thereof, salt thereof, or acid halide thereof. If none of the poly(alkylamine) is present in the composition, and the linear diepoxide is present in the composition, then at least some of the aryldicarboxylic acid, ester thereof, or salt thereof can be present in the composition. The linear diepoxide, if present, can form any suitable proportion of the composition, such as about 0.001 wt % to about 50 wt % of the composition, about 0.01 wt % to about 30 wt %, or about 0.001 wt % or less, or about 0.01 wt %, 0.1, 1, 2, 3, 4, 5, 10, 15, 20, 25, 30, 35, 40, 45, or about 50 wt % or more.

The linear diepoxide can be an epoxide-terminated linear molecule, such as a polymer that has a linear backbone or a non-polymeric compound. The linear diepoxide can be any suitable proportion of the composition. The linear diepoxide can have the following structure:

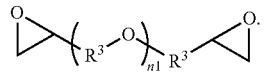

At each occurrence $R^3$ can be independently a substituted or unsubstituted ($C_1$-$C_{30}$)hydrocarbylene. At each occurrence $R^3$ can be independently a ($C_1$-$C_{10}$)alkylene. The variable $R^3$ can be methylene. The variable n1 can be any suitable integer, such as about 0 to about 100,000, about 1 to about 50,000, or about 0, 1, 2, 3, 4, 5, 10, 15, 20, 25, 30, 35, 40, 45, 50, 75, 100, 125, 150, 175, 200, 250, 500, 750, 1,000, 1,500, 2,000, 2,500, 5,000, 10,000, 15,000, 20,000, 25,000, 50,000, 75,000, or about 100,000 or more. The variable n1 can be 1. In some embodiments, the linear diepoxide has the following structure:

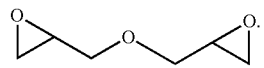

In some embodiments, $R^3$ can be a 3,3'-substituted 2,2-diphenylpropane. In some embodiments, the linear diepoxide can be a bisphenol A diglycidyl ether, and can have the following structure:

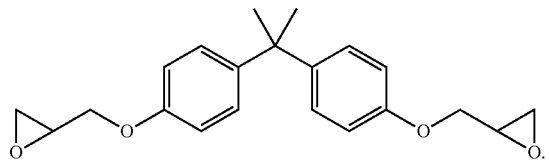 [SMILES: CC(C)(c1ccc(OCC2CO2)cc1)c1ccc(OCC2CO2)cc1]

The poly(alkylamine) can be a branched or linear polymer or polyamine. Any suitable proportion of the composition can be the poly(alkylamine), such as about 0.001 wt % to about 50 wt % of the composition, about 0.01 wt % to about 30 wt %, or about 0.001 wt % or less, or about 0.01 wt %, 0.1, 1, 2, 3, 4, 5, 10, 15, 20, 25, 30, 35, 40, 45, or about 50 wt % or more. The poly(alkylamine) can have the following structure:

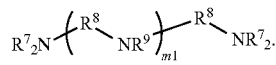

The poly(alkylamine) can be polyethyleneimine. The poly(alkylamine) can be hydrophobically-modified polyethyleneimine, e.g., having one or more N—H groups replaced by substituted or unsubstituted N—($C_1$-$C_{30}$)hydrocarbyl groups.

At each occurrence, $R^7$ can be selected from the group consisting of —H and a substituted or unsubstituted ($C_1$-$C_{30}$)hydrocarbyl. At each occurrence, $R^7$ can be selected from the group consisting of —H and a substituted or unsubstituted ($C_1$-$C_{30}$)alkyl. At each occurrence, $R^7$ can be selected from the group consisting of —H and a ($C_1$-$C_{30}$) alkyl.

At each occurrence, $R^8$ can be a substituted or unsubstituted ($C_1$-$C_{30}$)hydrocarbylene. At each occurrence, $R^8$ can be ($C_1$-$C_{20}$)alkylene. At each occurrence, $R^8$ can be ($C_1$-$C_5$) alkylene. At each occurrence, $R^8$ can be ethylene.

At each occurrence, $R^9$ can be selected from the group consisting of —H, a substituted or unsubstituted ($C_1$-$C_{30}$)hydrocarbyl, and a substituted or unsubstituted ($C_1$-$C_{30}$)hydrocarbylene terminated with —$NR^9{}_2$. At each occurrence, $R^9$ can be selected from the group consisting of —H, a substituted or unsubstituted ($C_1$-$C_{30}$)alkyl, and a substituted or unsubstituted ($C_1$-$C_{30}$)alkylene terminated with —$NR^9{}_2$. At each occurrence, $R^9$ can be selected from the group consisting of —H, a ($C_1$-$C_{30}$)alkyl, and a ($C_2$-$C_{10}$)alkylene terminated with —$NR^9{}_2$. At each occurrence, $R^9$ can be selected from the group consisting of —H, a ($C_1$-$C_{30}$)alkyl, and —$(CH_2)_2$—$NR^9{}_2$.

The variable m1 can be any suitable integer, such as about 0 to about 100,000, or about 1 to about 50,000, or about 0, 1, 2, 3, 4, 5, 10, 15, 20, 25, 30, 35, 40, 45, 50, 75, 100, 125, 150, 175, 200, 250, 500, 750, 1,000, 1,500, 2,000, 2,500, 5,000, 10,000, 15,000, 20,000, 25,000, 50,000, 75,000, or about 100,000 or more.

The composition can include at least one of an alkoxy- or hydroxy-substituted silane comprising an epoxy group and an alkoxy- or hydroxy-substituted silane comprising an amine group. In various embodiments, the alkoxy- or hydroxy-substituted silane can bond with a particulate surface, such as the surface of a proppant or gravel, or can bond with a subterranean surface. For example, a proppant, gravel, or subterranean surface having an —OH group can react with the hydroxy or alkoxy group on the silane to form a covalent bond to the subterranean surface via an —O— group, such the linkage (subterranean surface/proppant surface/gravel surface)-O—Si wherein the Si-atom is the silicon atom of the silane group that had the hydroxy or alkoxy group substituted thereon. The bonding to the surface can occur at least one of before, during, and after the curing of the composition.

Any suitable proportion of the composition can be the alkoxy- or hydroxy-substituted silane including the epoxy group, such as about 0.001 wt % to about 50 wt % of the composition, about 0.01 wt % to about 30 wt %, or about 0.001 wt % or less, or about 0.01 wt %, 0.1, 1, 2, 3, 4, 5, 10, 15, 20, 25, 30, 35, 40, 45, or about 50 wt % or more. The alkoxy- or hydroxy-substituted silane including the epoxy group can have the following structure:

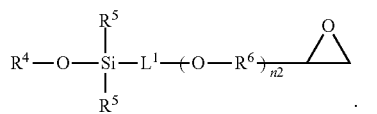

The variable $R^4$ can be independently selected from the group consisting of —H and a substituted or unsubstituted ($C_1$-$C_{30}$)hydrocarbyl interrupted by 0, 1, 2, or 3 groups independently chosen from —O— and —S—. The variable $R^4$ can be selected from the group consisting of —H and a ($C_1$-$C_{20}$)alkyl. The variable $R^4$ can be ($C_1$-$C_5$)alkyl. The variable $R^4$ can be —$CH_3$.

At each occurrence, $R^5$ can be independently selected from the group consisting of a substituted or unsubstituted ($C_1$-$C_{30}$)hydrocarbyl interrupted by 0, 1, 2, or 3 groups independently chosen from —O— and —S—, and a substituted or unsubstituted ($C_1$-$C_{30}$)hydrocarbyloxy interrupted by 0, 1, 2, or 3 groups independently chosen from —O— and —S—. At each occurrence, $R^5$ can be ($C_1$-$C_{20}$)alkoxy. At each occurrence, $R^5$ can be —$OCH_3$.

At each occurrence, $R^6$ can be independently a substituted or unsubstituted ($C_1$-$C_{30}$)hydrocarbylene. At each occurrence, $R^6$ can be ($C_1$-$C_{20}$)alkylene. At each occurrence, $R^6$ can be ($C_1$-$C_5$)alkylene. At each occurrence, $R^6$ can be methylene. In some embodiments. In some embodiments, $R^6$ can be a 3,3'-substituted 2,2-diphenylpropane.

The variable $L^1$ can be a substituted or unsubstituted ($C_1$-$C_{30}$)hydrocarbylene. The variable $L^1$ can be ($C_1$-$C_{20}$)alkylene. The variable $L^1$ can be ($C_1$-$C_5$)alkylene. The variable $L^1$ can be propylene.

The variable n2 can be any suitable integer, such as about 0 to about 100,000, or about 1 to about 50,000, or about 0, 1, 2, 3, 4, 5, 10, 15, 20, 25, 30, 35, 40, 45, 50, 75, 100, 125, 150, 175, 200, 250, 500, 750, 1,000, 1,500, 2,000, 2,500, 5,000, 10,000, 15,000, 20,000, 25,000, 50,000, 75,000, or about 100,000 or more. The variable n2 can be 1.

In some embodiments, the alkoxy- or hydroxy-substituted silane including the epoxy group has the following structure:

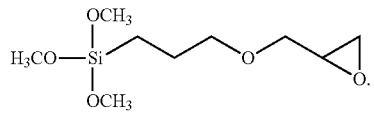

The alkoxy- or hydroxy-substituted silane including the amine group can form any suitable proportion of the composition, such as about 0.001 wt % to about 50 wt % of the composition, about 0.01 wt % to about 30 wt %, or about 0.001 wt % or less, or about 0.01 wt %, 0.1, 1, 2, 3, 4, 5, 10, 15, 20, 25, 30, 35, 40, 45, or about 50 wt % or more. The alkoxy- or hydroxy-substituted silane including the amine group can have the following structure:

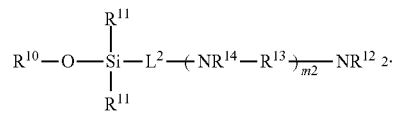

The variable $R^{10}$ can be independently selected from the group consisting of —H and a substituted or unsubstituted ($C_1$-$C_{30}$)hydrocarbyl interrupted by 0, 1, 2, or 3 groups independently chosen from —O—, substituted or unsubstituted —NH—, and —S—. The variable $R^{10}$ can be selected from the group consisting of —H and a ($C_1$-$C_{20}$)alkyl. The variable $R^{10}$ can be ($C_1$-$C_5$)alkyl. The variable $R^{10}$ can be —$CH_3$.

At each occurrence, $R^{11}$ can be independently selected from the group consisting of a substituted or unsubstituted ($C_1$-$C_{30}$)hydrocarbyl interrupted by 0, 1, 2, or 3 groups independently chosen from —O— and —S—, and a substituted or unsubstituted ($C_1$-$C_{30}$)hydrocarbyloxy interrupted by 0, 1, 2, or 3 groups independently chosen from —O— and —S—. At each occurrence, $R^{11}$ can be ($C_1$-$C_2$)alkoxy. At each occurrence, $R^{11}$ can be —$OCH_3$.

The variable $R^{12}$ can be selected from the group consisting of —H and a substituted or unsubstituted ($C_1$-$C_{30}$)hydrocarbyl. The variable $R^{12}$ can be selected from the group consisting of —H and a substituted or unsubstituted ($C_1$-$C_{30}$)alkyl. The variable $R^{12}$ can be selected from the group consisting of —H and a ($C_1$-$C_{30}$)alkyl.

The variable $R^{13}$ can be a substituted or unsubstituted ($C_1$-$C_{30}$)hydrocarbylene. The variable $R^{13}$ can be ($C_1$-$C_2$)alkylene. The variable $R^{13}$ can be ($C_1$-$C_5$)alkylene. The variable $R^{13}$ can be ethylene.

The variable $R^{14}$ can be selected from the group consisting of —H, a substituted or unsubstituted ($C_1$-$C_{30}$)hydrocarbyl, and a substituted or unsubstituted ($C_1$-$C_{30}$)hydrocarbylene terminated with —$NR^{14}{}_2$. The variable $R^{14}$ can be selected from the group consisting of —H, a substituted or unsubstituted ($C_1$-$C_{30}$)alkyl, and a substituted or unsubstituted ($C_1$-$C_{30}$)alkylene terminated with —$NR^{14}{}_2$. The variable $R^{14}$ can be selected from the group consisting of —H, a ($C_1$-$C_{30}$)alkyl, and a ($C_2$-$C_{10}$)alkylene terminated with —$NR^{14}{}_2$. The variable $R^{14}$ can be selected from the group consisting of —H, a ($C_1$-$C_{30}$)alkyl, and —$(CH_2)_2$—$NR^{14}{}_2$.

The variable $L^2$ can be a substituted or unsubstituted $(C_1-C_{30})$hydrocarbylene. The variable $L^2$ can be $(C_1-C_{20})$alkylene. The variable $L^2$ can be $(C_1-C_5)$alkylene. The variable $L^2$ can be propylene.

The variable m2 can be any suitable integer, such as about 0 to about 100,000, or about 1 to about 50,000, or about 0, 1, 2, 3, 4, 5, 10, 15, 20, 25, 30, 35, 40, 45, 50, 75, 100, 125, 150, 175, 200, 250, 500, 750, 1,000, 1,500, 2,000, 2,500, 5,000, 10,000, 15,000, 20,000, 25,000, 50,000, 75,000, or about 100,000 or more. The variable m2 can be 1.

In some embodiments, the alkoxy- or hydroxy-substituted silane including the amine group has the following structure:

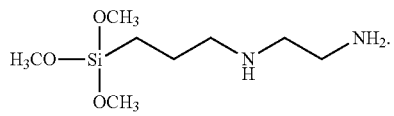

In some embodiments, the composition includes the aryldicarboxylic acid, salt thereof, or ester thereof and the linear diepoxide. The method can include curing the composition to form a cured product including a repeating unit having the structure:

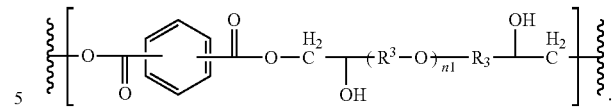

At each occurrence, $R^3$ can be independently a substituted or unsubstituted $(C_1-C_{30})$hydrocarbylene. The variable n1 can be about 0 to about 100,000. The repeating unit can have the structure:

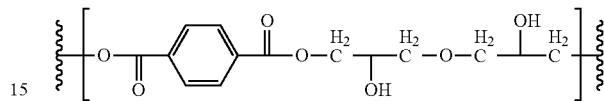

The composition can include the aryldicarboxylic acid, salt thereof, or ester thereof and the alkoxy- or hydroxy-substituted silane including the epoxy group. The method can include curing the composition to form a cured product having the structure:

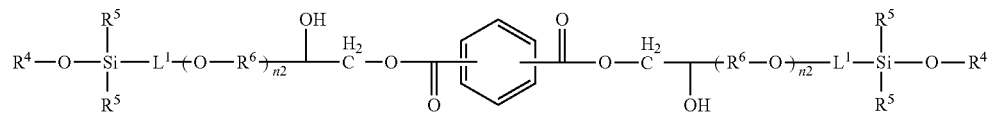

The variable $R^4$ can be independently selected from the group consisting of —H and a substituted or unsubstituted $(C_1-C_{30})$hydrocarbyl interrupted by 0, 1, 2, or 3 groups independently chosen from —O—, substituted or unsubstituted —NH—, and —S—. At each occurrence, $R^5$ can be independently selected from the group consisting of a substituted or unsubstituted $(C_1-C_{30})$hydrocarbyl interrupted by 0, 1, 2, or 3 groups independently chosen from —O— and —S—, and a substituted or unsubstituted $(C_1-C_{30})$hydrocarbyloxy interrupted by 0, 1, 2, or 3 groups independently chosen from —O— and —S—. The variable $L^1$ can be a substituted or unsubstituted $(C_1-C_{30})$hydrocarbylene. At each occurrence, $R^6$ can be independently a substituted or unsubstituted $(C_1-C_{30})$hydrocarbylene. The variable n2 can be about 0 to about 100,000. The repeating unit can have the structure:

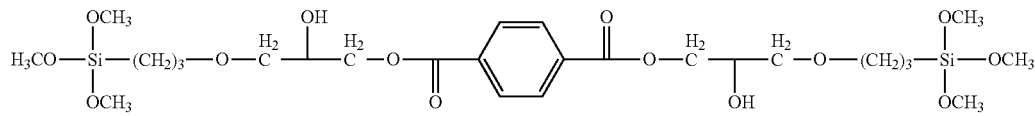

The composition can include the aryldicarboxylic acid, salt thereof, or ester thereof, the alkoxy- or hydroxy-substituted silane including the epoxy group, and the linear diepoxide. The method can include curing the composition to form a cured product having the structure:

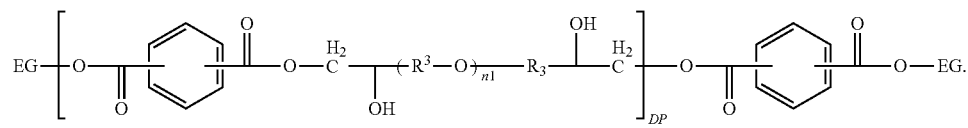

The variable EG can have the following structure:

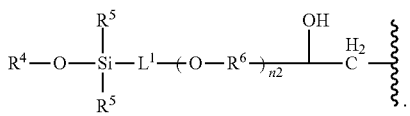

At each occurrence $R^3$ can be independently a substituted or unsubstituted $(C_1$-$C_{30})$hydrocarbylene. The variable n1 can be about 0 to about 100,000. The variable $R^4$ can be independently selected from the group consisting of —H and a substituted or unsubstituted $(C_1$-$C_{30})$hydrocarbyl interrupted by 0, 1, 2, or 3 groups independently chosen from —O— and —S—. At each occurrence, $R^5$ can be independently selected from the group consisting of a substituted or unsubstituted $(C_1$-$C_{30})$hydrocarbyl interrupted by 0, 1, 2, or 3 groups independently chosen from —O— and —S—, and a substituted or unsubstituted $(C_1$-$C_{30})$hydrocarbyloxy interrupted by 0, 1, 2, or 3 groups independently chosen from —O— and —S—. At each occurrence, $R^6$ can be independently a substituted or unsubstituted $(C_1$-$C_{30})$ hydrocarbylene. The variable n2 can be about 0 to about 100,000. The cured composition can have the structure:

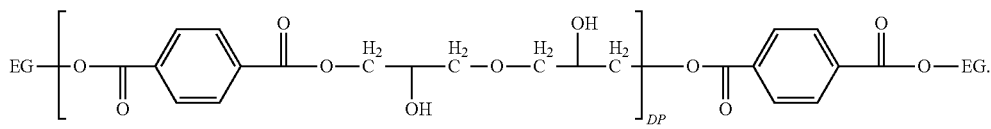

The variable EG can have the following structure:

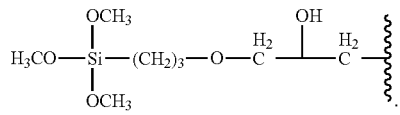

The composition can include the aryldicarboxylic acid, salt thereof, ester thereof, or acid halide thereof, and the poly(alkylamine). The method can include curing the composition to form a cured product including a repeating unit having the structure:

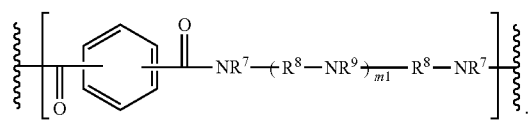

At each occurrence, $R^7$ can be selected from the group consisting of —H, a substituted or unsubstituted $(C_1$-$C_{30})$ hydrocarbyl, and —CL. At each occurrence, $R^8$ can be a substituted or unsubstituted $(C_1$-$C_{30})$hydrocarbylene. At each occurrence, $R^9$ can be selected from the group consisting of —H, a substituted or unsubstituted $(C_1$-$C_{30})$hydrocarbyl, a substituted or unsubstituted $(C_1$-$C_{30})$hydrocarbylene terminated with at least one of —$NR^9{}_2$, —$NR^9CL$, and —$N(CL)_2$. The variable m1 can be about 0 to about 100,000. The variable CL can be an inter- or intra-molecular bond to the non-$NR^7$-bound carbonyl group of the repeating unit. The repeating unit can have the structure:

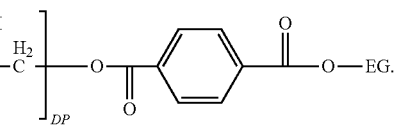

At each occurrence, $R^7$ can be selected from the group consisting of —H, a substituted or unsubstituted $(C_1$-$C_{30})$ hydrocarbyl, and —CL. At each occurrence, $R^9$ can be selected from the group consisting of —H, a substituted or unsubstituted $(C_1$-$C_{30})$hydrocarbyl, and a substituted or unsubstituted $(C_1$-$C_{30})$hydrocarbylene terminated with at least one of —$NR^9{}_2$, —$NR^9CL$, and —$N(CL)_2$. The variable m1 can be about 0 to about 100,000. The variable CL can be an inter- or intra-molecular bond to the non-$NR^7$-bound carbonyl group of the repeating unit.

The composition can include the aryldicarboxylic acid, salt thereof, ester thereof, or acid halide thereof, and the alkoxy- or hydroxy-substituted silane including the amine group. The method can include curing the composition to form a cured product having the structure:

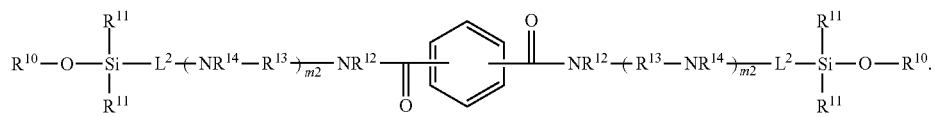

The variable $R^{10}$ can be independently selected from the group consisting of —H and a substituted or unsubstituted $(C_1$-$C_{30})$hydrocarbyl interrupted by 0, 1, 2, or 3 groups independently chosen from —O—, substituted or unsubstituted —NH—, and —S—. At each occurrence, $R^{11}$ can be independently selected from the group consisting of a substituted or unsubstituted $(C_1$-$C_{30})$hydrocarbyl interrupted by 0, 1, 2, or 3 groups independently chosen from —O— and —S—, and a substituted or unsubstituted $(C_1$-$C_{30})$hydrocarbyloxy interrupted by 0, 1, 2, or 3 groups independently chosen from —O— and —S—. The variable $L^2$ can be a substituted or unsubstituted $(C_1$-$C_{30})$hydrocarbylene. The variable $R^{12}$ can be selected from the group consisting of —H, a substituted or unsubstituted $(C_1$-$C_{30})$hydrocarbyl, and —CL. The variable $R^{13}$ can be a substituted or unsubstituted $(C_1$-$C_{30})$hydrocarbylene. The variable $R^{14}$ can be selected from the group consisting of —H, a substituted or unsubstituted ($C_1$-$C_{30}$)hydrocarbyl, and a substituted or unsubstituted ($C_1$-$C_{30}$)hydrocarbylene terminated with at least one of —$NR^{14}_2$, —$NR^{14}CL$, and —$N(CL)_2$. The variable m2 can be about 0 to about 100,000. The variable CL can be an inter- or intra-molecular bond to a carbonyl group from the aryldicarboxylic acid, salt thereof, ester thereof, or acid halide thereof incorporated in the cured product, such as having the structure:

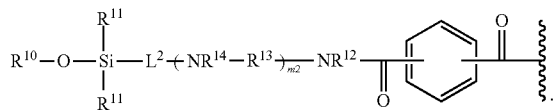

The cured composition can have the structure:

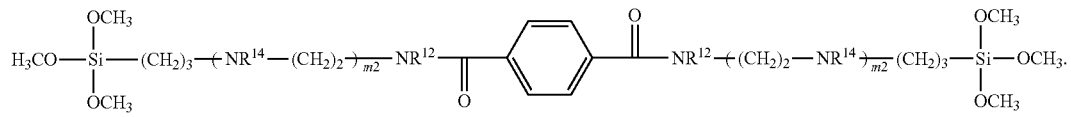

The variable $R^{12}$ can be selected from the group consisting of —H, a substituted or unsubstituted ($C_1$-$C_{30}$)hydrocarbyl, and —CL. The variable $R^{14}$ can be selected from the group consisting of —H, a substituted or unsubstituted ($C_1$-$C_{30}$) hydrocarbyl, and a substituted or unsubstituted ($C_1$-$C_{30}$) hydrocarbylene terminated with at least one of —$NR^{14}_2$, —$NR^{14}CL$, and —$N(CL)_2$. The variable m2 can be about 0 to about 100,000. The variable CL can be an inter- or intra-molecular bond to a carbonyl group from the aryldicarboxylic acid, salt thereof, ester thereof, or acid halide thereof incorporated in the cured product, such as having the structure:

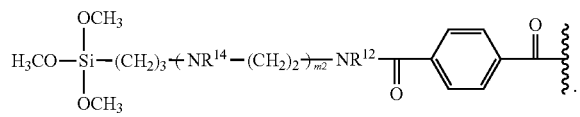

The composition can include the aryldicarboxylic acid, salt thereof, ester thereof, or acid halide thereof, the alkoxy- or hydroxy-substituted silane including the amine group, and the linear diepoxide. The method can including curing the composition to form a cured product including a repeating unit having the structure:

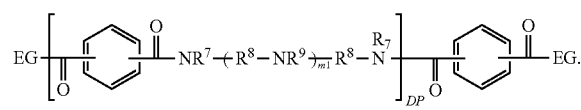

The variable EG can have the following structure:

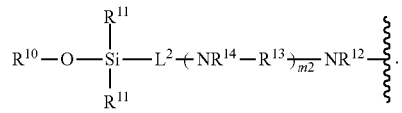

At each occurrence, $R^7$ can be selected from the group consisting of —H, a substituted or unsubstituted ($C_1$-$C_{30}$) hydrocarbyl, and —CL. At each occurrence, $R^8$ can be a substituted or unsubstituted ($C_1$-$C_{30}$)hydrocarbylene. At each occurrence, $R^9$ can be selected from the group consisting of —H, a substituted or unsubstituted ($C_1$-$C_{30}$)hydrocarbyl, and a substituted or unsubstituted ($C_1$-$C_{30}$)hydrocarbylene terminated with at least one of —$NR^9_2$, —$NR^9CL$, and —$N(CL)_2$. The variable m1 can be about 0 to about 100,000. At each occurrence, $L^2$ can be a substituted or unsubstituted ($C_1$-$C_{30}$)hydrocarbylene. At each occurrence, $R^{10}$ can be independently selected from the group consisting of —H and a substituted or unsubstituted ($C_1$-$C_{30}$)hydrocarbyl interrupted by 0, 1, 2, or 3 groups independently chosen from —O—, substituted or unsubstituted —NH—, and —S—. At each occurrence, $R^{11}$ is independently selected from the group consisting of a substituted or unsubstituted ($C_1$-$C_{30}$)hydrocarbyl interrupted by 0, 1, 2, or 3 groups independently chosen from —O— and —S—, and a substituted or unsubstituted ($C_1$-$C_{30}$)hydrocarbyloxy interrupted by 0, 1, 2, or 3 groups independently chosen from —O— and —S—. At each occurrence, $R^{12}$ can be selected from the group consisting of —H, a substituted or unsubstituted ($C_1$-$C_{30}$)hydrocarbyl, and —CL. At each occurrence, $R^{13}$ can be independently a substituted or unsubstituted ($C_1$-$C_{30}$)hydrocarbylene. The variable $R^{14}$ can be selected from the group consisting of —H, a substituted or unsubstituted ($C_1$-$C_{30}$)hydrocarbyl, and a substituted or unsubstituted ($C_1$-$C_{30}$)hydrocarbylene terminated with at least one of —$NR^{14}_2$, —$NR^{14}CL$, and —$N(CL)_2$. The variable m2 can be about 0 to about 100,000. The variable CL can be an inter- or intra-molecular bond to a carbonyl group from the aryldicarboxylic acid, salt thereof, ester thereof, or acid halide thereof incorporated in the cured product, such as having the structure:

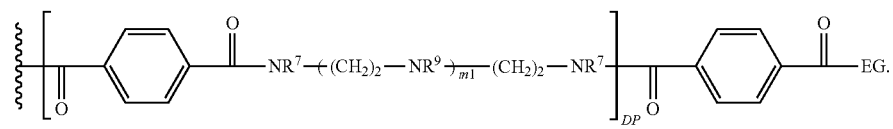

The repeating unit can have the structure:

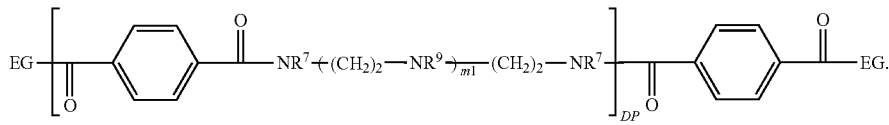

The variable EG can have the following structure:

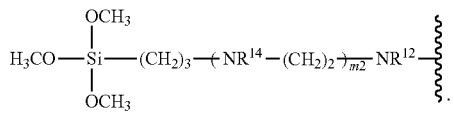

At each occurrence, $R^7$ can be selected from the group consisting of —H, a substituted or unsubstituted ($C_1$-$C_{30}$) hydrocarbyl, and —CL. At each occurrence, $R^9$ can be selected from the group consisting of —H, a substituted or unsubstituted ($C_1$-$C_{30}$)hydrocarbyl, and a substituted or unsubstituted ($C_1$-$C_{30}$)hydrocarbylene terminated with at least one of —$NR^9_2$, —$NR^9CL$, and —$N(CL)_2$. The variable m1 can be about 0 to about 100,000. At each occurrence, $R^{12}$ can be selected from the group consisting of —H, a substituted or unsubstituted ($C_1$-$C_{30}$)hydrocarbyl, and —CL. The variable $R^{14}$ can be selected from the group consisting of —H, a substituted or unsubstituted ($C_1$-$C_{30}$)hydrocarbyl, and a substituted or unsubstituted ($C_1$-$C_{30}$)hydrocarbylene terminated with at least one of —$NR^{14}_2$, —$NR^{14}CL$, —$N(CL)_2$. The variable m2 can be about 0 to about 100,000. The variable CL can be an inter- or intra-molecular bond to a carbonyl group from the aryldicarboxylic acid, salt thereof, ester thereof, or acid halide thereof incorporated in the cured product, such as having the structure:

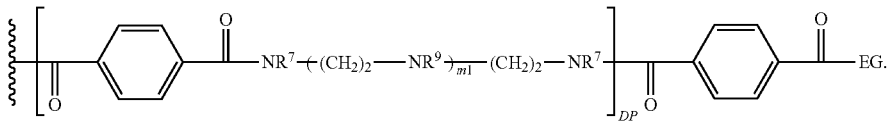

For the structures shown herein, DP indicates degree of polymerization, and can have any suitable integer value, such as about 1 to about 100,000,000, or about 5 to about 10,000,000, or about 1, 2, 3, 4, 5, 10, 15, 20, 25, 30, 35, 40, 45, 50, 75, 100, 125, 150, 175, 200, 250, 500, 750, 1,000, 1,500, 2,000, 2,500, 5,000, 7,500, 10,000, 15,000, 20,000, 25,000, 50,000, 100,000, 200,000, 500,000, 1,000,000, 5,000,000, 10,000,000, 50,000,000, 75,000,000, or about 100,000,000 or more.

Herein, a positively charged counterion can be any suitable counterion, such as sodium ($Na^+$), potassium ($K^+$), lithium ($Li^+$), hydrogen ($H^+$), zinc ($Zn^+$), or ammonium ($NH_4^+$). In some embodiments, the counterion can have a positive charge greater than +1, which can in some embodiments complex to multiple ionized groups, such as $Ca^{2+}$, $Mg^{2+}$, $Zn^{2+}$ or $Al^{3+}$.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$)hydrocarbyl (e.g., ($C_1$-$C_{10}$)alkyl or ($C_6$-$C_{20}$)aryl) at least one of interrupted with 0, 1, 2, or 3 groups independently substituted from —O—, substituted or unsubstituted —NH—, and —S—, a poly (substituted or unsubstituted ($C_1$-$C_{20}$)hydrocarbyloxy), and a poly(substituted or unsubstituted ($C_1$-$C_{20}$)hydrocarbylamino).

Other Components.

The composition including an aryl component and an amine or epoxide component, a mixture including the composition, or a cured product thereof, can include any suitable additional component in any suitable proportion, such that the composition, mixture including the same, or cured product thereof, can be used as described herein.

In some embodiments, the composition or a cured product thereof further includes a silane coupling agent. The silane coupling agent can be any suitable silane coupling agent. For example, the silane coupling agent can be a ($C_1$-$C_{30}$)hydrocarbyl-substituted trimethoxysilane, wherein the hydrocarbyl group is substituted or unsubstituted. The silane coupling agent can be N-2-(aminoethyl)-3-aminopropyltrimethoxysilane, 3-glycidoxypropyltrimethoxysilane, or n-beta-(aminoethyl)-gamma-aminopropyltrimethoxysilane. Any suitable amount of the composition or a cured product thereof, can be the silane coupling agent, such as about 0.001 wt % to about 20 wt %, or about 0.001 wt % to about 3 wt %, or about 0.001 wt % or less, or about 0.01, 0.1, 1, 2, 3, 4, 5, 6, 8, 10, 12, 14, 16, 18, or about 20 wt % or more.

The composition or a cured product thereof can include one or more surfactants. The surfactant can facilitate the coating of the curable components of the composition on proppant, gravel, or a subterranean surface causing the curable components to flow to the contact points between adjacent proppant particles. The surfactant can be any suitable surfactant, such that the composition can be used as described herein. The surfactant can form any suitable proportion of the composition or a cured product thereof, such that the composition or cured product thereof can be used as described herein. For example, about 0.000,1 wt % to about 20 wt % of the composition or cured product thereof can be the one or more surfactants, about 0.001 wt % to about 1 wt %, or about 0.000.1 wt % or less, or about 0.001 wt %, 0.005, 0.01, 0.02, 0.04, 0.06, 0.08, 0.1, 0.2, 0.3, 0.4, 0.5, 0.6, 0.8, 1, 2, 3, 4, 5, 6, 7, 8, 9, 10, 11, 12, 13, 14, 15, 16, 17, 18, 19, or about 20 wt % or more.

In some embodiments, the surfactant is at least one of a cationic surfactant, an anionic surfactant, and a non-ionic surfactant. In some embodiments, the ionic groups of the surfactant can include counterions, such that the overall charge of the ionic groups is neutral, whereas in other embodiments, no counterion can be present for one or more ionic groups, such that the overall charge of the one or more ionic groups is not neutral.

In one example, the surfactant can be a non-ionic surfactant. Examples of non-ionic surfactants can include polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, polyoxyalkylene glycol modified polysiloxane surfactants, and mixtures, copolymers or reaction products thereof. In one example, the surfactant is polyglycol-modified trimethylsilylated silicate surfactant. Examples of suitable non-ionic surfactants can include, but are not limited to, condensates of ethylene oxide with long chain fatty alcohols or fatty acids such as a $(C_{12-16})$alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, fatty amine oxides, polyoxyalkylene alkyl ethers such as polyethylene glycol long chain alkyl ether, polyoxyalkylene sorbitan ethers, polyoxyalkylene alkoxylate esters, polyoxyalkylene alkylphenol ethers, ethylene glycol propylene glycol copolymers and alkylpolysaccharides, polymeric surfactants such as polyvinyl alcohol (PVA) and polyvinylmethylether. In certain embodiments, the surfactant is a polyoxyethylene fatty alcohol or mixture of polyoxyethylene fatty alcohols. In other embodiments, the surfactant is an aqueous dispersion of a polyoxyethylene fatty alcohol or mixture of polyoxyethylene fatty alcohols. In some examples, suitable non-ionic surfactants can include at least one of an alkyl polyglycoside, a sorbitan ester, a methyl glucoside ester, an amine ethoxylate, a diamine ethoxylate, a polyglycerol ester, an alkyl ethoxylate, an alcohol that has been at least one of polypropoxylated and polyethoxylated, any derivative thereof, or any combination thereof.

Examples of suitable anionic surfactants can include, but are not limited to, alkyl sulphates such as lauryl sulphate, polymers such as acrylates/$C_{10-30}$ alkyl acrylate crosspolymer alkylbenzenesulfonic acids and salts such as hexylbenzenesulfonic acid, octylbenzenesulfonic acid, decylbenzenesulfonic acid, dodecylbenzenesulfonic acid, cetylbenzenesulfonic acid and myristylbenzenesulfonic acid; the sulphate esters of monoalkyl polyoxyethylene ethers; alkylnapthylsulfonic acid; alkali metal sulfoccinates, sulfonated glyceryl esters of fatty acids such as sulfonated monoglycerides of coconut oil acids, salts of sulfonated monovalent alcohol esters, amides of amino sulfonic acids, sulfonated products of fatty acid nitriles, sulfonated aromatic hydrocarbons, condensation products of naphthalene sulfonic acids with formaldehyde, sodium octahydroanthracene sulfonate, alkali metal alkyl sulphates, ester sulphates, and alkarylsulfonates. Anionic surfactants can include alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates.

Suitable cationic surfactants can include at least one of an arginine methyl ester, an alkanolamine, an alkylenediamide, an alkyl ester sulfonate, an alkyl ether sulfonate, an alkyl ether sulfate, an alkali metal alkyl sulfate, an alkyl or alkylaryl sulfonate, a sulfosuccinate, an alkyl or alkylaryl disulfonate, an alkyl disulfate, an alcohol polypropoxylated or polyethoxylated sulfates, a taurate, an amine oxide, an alkylamine oxide, an ethoxylated amide, an alkoxylated fatty acid, an alkoxylated alcohol, an ethoxylated fatty amine, an ethoxylated alkyl amine, a betaine, a modified betaine, an alkylamidobetaine, a quaternary ammonium compound, any derivative thereof, and any combination thereof. Examples of suitable cationic surfactants can include quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide as well as corresponding salts of these materials, fatty amines and fatty acid amides and their derivatives, basic pyridinium compounds, and quaternary ammonium bases of benzimidazolines and poly(ethoxylated/propoxylated)amines.

In some embodiments, the surfactant can be selected from Tergitol™ 15-s-3, Tergitol™ 15-s-40, sorbitan monooleate, polyglycol-modified trimethsilylated silicate, polyglycol-modified siloxanes, polyglycol-modified silicas, ethoxylated quaternary ammonium salt solutions, cetyltrimethylammonium chloride or bromide solutions, an ethoxylated nonyl phenol phosphate ester, and a $(C_{12}-C_{22})$alkyl phosphonate. In some examples, the surfactant can be a sulfonate methyl ester, a hydrolyzed keratin, a polyoxyethylene sorbitan monopalmitate, a polyoxyethylene sorbitan monostearate, a polyoxyethylene sorbitan monooleate, a linear alcohol alkoxylate, an alkyl ether sulfate, dodecylbenzene sulfonic acid, a linear nonyl-phenol, dioxane, ethylene oxide, polyethylene glycol, an ethoxylated castor oil, dipalmitoyl-phosphatidylcholine, sodium 4-(1' heptylnonyl)benzenesulfonate, polyoxyethylene nonyl phenyl ether, sodium dioctyl sulphosuccinate, tetraethyleneglycoldodecylether, sodium octylbenzenesulfonate, sodium hexadecyl sulfate, sodium laureth sulfate, decylamine oxide, dodecylamine betaine, dodecylamine oxide, N,N,N-trimethyl-1-octadecammonium chloride, xylenesulfonate and salts thereof (e.g., sodium xylene sulfonate), sodium dodecyl sulfate, cetyltrimethylammonium bromide, any derivative thereof, or any combination thereof. The surfactant can be at least one of alkyl propoxy-ethoxysulfonate, alkyl propoxy-ethoxysulfate, alkylaryl-propoxy-ethoxysulfonate, a mixture of an ammonium salt of an alkyl ether sulfate, cocoamidopropyl betaine, cocoamidopropyl dimethylamine oxide, an ethoxylated alcohol ether sulfate, an alkyl or alkene amidopropyl betaine, an alkyl or alkene dimethylamine oxide, an alpha-olefinic sulfonate surfactant, any derivative thereof, and any combination thereof. Suitable surfactants may also include polymeric surfactants, block copolymer surfactants, di-block polymer surfactants, hydrophobically modified surfactants, fluoro-surfactants, and surfactants containing a non-ionic spacer-arm central extension and an ionic or nonionic polar group. In some examples, the non-ionic spacer-arm central extension can be the result of at least one of polypropoxylation and polyethoxylation.

In various embodiments, the surfactant is at least one of a substituted or unsubstituted $(C_5-C_{50})$hydrocarbylsulfate salt, a substituted or unsubstituted $(C_5-C_{50})$hydrocarbylsulfate $(C_1-C_{20})$hydrocarbyl ester wherein the $(C_1-C_{20})$hydrocarbyl is substituted or unsubstituted, and a substituted or unsubstituted $(C_5-C_{50})$hydrocarbylbisulfate. The surfactant can be at least one of a $(C_5-C_{20})$alkylsulfate salt, a $(C_5-C_{20})$alkylsulfate $(C_1-C_2)$alkyl ester and a $(C_5-C_{20})$alkylbisulfate. In various embodiments the surfactant is a $(C_5-C_{15})$alkylsulfate salt, wherein the counterion can be any suitable counterion, such as $Na^+$, $K^+$, $Li^+$, $H^+$, $Zn^+$, $NH_4^+$, $Ca^{2+}$, $Mg^{2+}$, $Zn^{2+}$, or $Al^{3+}$. In some embodiments, the surfactant is a $(C_5-C_{15})$alkylsulfate salt sodium salt. In some embodiments, the surfactant is sodium dodecyl sulfate.

In various embodiments, the surfactant is a $(C_5-C_{50})$ hydrocarbyltri$((C_1-C_{50})$hydrocarbyl)ammonium salt, wherein each $(C_5-C_{50})$hydrocarbyl is independently selected. The counterion can be any suitable counterion, such as $Na^+$, $K^+$, $Li^+$, $H^+$, $Zn^+$, $NH_4^+$, $Ca^{2+}$, $Mg^{2+}$, $Zn^{2+}$, or $Al^{3+}$. The surfactant can be a $(C_5-C_{50})$alkyltri$((C_1-C_{20})$alkyl)ammonium salt, wherein each $(C_5-C_{50})$alkyl is independently selected. The surfactant can be a $(C_{10}-C_{30})$alkyltri$((C_1-C_{10})$alkyl)ammonium halide salt, wherein each $(C_{10}-$ $C_{30}$)alkyl is independently selected. The surfactant can be cetyltrimethylammonium bromide.

In some embodiments, the composition or a cured product thereof can further include a hydrolyzable ester. The hydrolyzable ester can be any suitable hydrolyzable ester. For example, the hydrolyzable ester can be a $C_1$-$C_5$ mono-, di-, tri-, or tetra-alkyl ester of a $C_2$-$C_{40}$ mono-, di-, tri-, or tetra-carboxylic acid. The hydrolyzable ester can be at least one of dimethylglutarate, dimethyladipate, dimethylsuccinate, sorbitol, catechol, dimethylthiolate, methyl salicylate, dimethylsalicylate, and tert-butylhydroperoxide. Any suitable wt % of the composition or a cured product thereof can be the hydrolyzable ester, such as about 0.01 wt % to about 20 wt %, or about 0.1 wt % to about 5 wt %, or about 0.01 wt % or less, or about 0.1 wt %, 1, 2, 3, 4, 5, 6, 8, 10, 12, 14, 16, 18, or about 20 wt % or more.

In some embodiments, the composition or a cured product thereof further includes at least one tackifier. The tackifier can be any suitable wt % of the composition or cured product thereof, such as about 0.001 wt % to about 50 wt %, about 0.01 wt % to about 30 wt %, or about 0.001 wt % or less, or about 0.01 wt %, 0.1, 1, 2, 3, 4, 5, 10, 15, 20, 25, 30, 35, 40, 45, or about 50 wt % or more. The tackifier can be any suitable material having tackiness. For example, the tackifier can be an adhesive or a resin. The term "resin" as used herein refers to any of numerous physically similar polymerized synthetics or chemically modified natural resins including thermoplastic materials and thermosetting materials. In some embodiments, the tackifier can be at least one of a shellac, a polyamide, a silyl-modified polyamide, a polyester, a polycarbonate, a polycarbamate, a urethane, a natural resin, an epoxy-based resin, a furan-based resin, a phenolic-based resin, a urea-aldehyde resin, and a phenol/phenol formaldehyde/furfuryl alcohol resin. In some embodiments, the tackifier can be at least one of bisphenol A diglycidyl ether resin, butoxymethyl butyl glycidyl ether resin, bisphenol A-epichlorohydrin resin, and bisphenol F resin. In some embodiments, the tackifier can be at least one of an acrylic acid polymer, an acrylic acid ester polymer, an acrylic acid homopolymer, an acrylic acid ester homopolymer, poly(methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly (methyl methacrylate), poly(butyl methacrylate), poly(2-ethylhexyl methacrylate), an acrylamidomethylpropane sulfonate polymer or copolymer or derivative thereof, and an acrylic acid/acrylamidomethylpropane sulfonate copolymer. In some embodiments, the tackifier can include at least one of a trimer acid, a fatty acid, a fatty acid-derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, and a condensation reaction product of a polyacid and a polyamine.

In some embodiments, the tackifier can include an amine-containing polymer. In some embodiments, the tackifier can be hydrophobically-modified. In some embodiments, the tackifier can include at least one of a polyamine (e.g., spermidine and spermine), a polyimine (e.g., poly(ethylene imine) and poly(propylene imine)), a polyamide, poly(2-(N, N-dimethylamino)ethyl methacrylate), poly(2-(N,N-diethylamino)ethyl methacrylate), poly(vinyl imidazole), and a copolymer including monomers of at least one of the foregoing and monomers of at least one non-amine-containing polymer such as of at least one of polyethylene, polypropylene, polyethylene oxide, polypropylene oxide, polyvinylpyridine, polyacrylic acid, polyacrylate, and polymethacrylate. The hydrophobic modification can be any suitable hydrophobic modification, such as at least one $C_4$-$C_{30}$ hydrocarbyl including at least one of a straight chain, a branched chain, an unsaturated C—C bond, an aryl group, and any combination thereof.

In some embodiments, the composition or a cured product thereof can include a curing agent. The second curing agent can be any suitable curing agent. For example, the curing agent can include at least one of an amine, an aromatic amine, an aliphatic amine, a cyclo-aliphatic amine, polyamines, amides, polyamides, a polyethyleneimine, piperidine, triethylamine, benzyldimethylamine, N,N-dimethylaminopyridine, 2-(N,N-dimethylaminomethyl)phenol, tris (dimethylaminomethyl)phenol, N-2-(aminoethyl)-3-aminopropyltrimethoxysilane, 3-glycidoxypropyltrimethoxysilane, n-beta-(aminoethyl)-gamma-aminopropyl trimethoxysilane, n-beta-(aminoethyl)-gamma-aminopropyl trimethoxysilane, piperazine, derivatives of piperazine (e.g., aminoethylpiperazine), pyrrole, imidazole, pyrazole, pyridine, pyrazine, pyrimidine, pyridazine, indolizine, isoindole, indole, indazole, purine, quinolizine, quinoline, isoquinoline, phthalazine, naphthyridine, quinoxaline, quinazoline, carbazole, carbazole, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, azepine, 1,3,5-triazine, thiazole, pteridine, dihydroquinoline, hexamethyleneimine, indazole, 2-ethyl-4-methyl imidazole, 1,1,3-trichlorotrifluoroacetone, and combinations thereof. The curing agent can form any suitable wt % of the composition or a cured product thereof, such as about 0.001 wt % to about 50 wt %, about 0.01 wt % to about 20 wt %, or about 0.001 wt % or less, or about 0.01 wt %, 1, 2, 3, 4, 5, 10, 15, 20, 25, 30, 35, 40, 45, or about 50 wt % or more.

In some embodiments, the composition or cured product thereof includes one or more viscosifiers. The viscosifier can be any suitable viscosifier. The viscosifier can affect the viscosity of the composition, cured product thereof, or a solvent that contacts the composition or cured product thereof at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000.1 wt % to about 10 wt % of the composition or a cured product thereof, about 0.004 wt % to about 0.01 wt %, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$)alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar (e.g., hydroxypropyl guar, carboxy methyl guar, or carboxymethyl hydroxypropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstitued $(C_2-C_{50})$hydrocarbyl having at least one aliphatic unsaturated C—C bond therein, and a substituted or unsubstituted $(C_2-C_{50})$alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic acid anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C_1-C_{10})$alkenyl nitrogen containing substituted or unsubstituted $(C_1-C_{10})$heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the composition or a cured product thereof can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a $(C_1-C_{20})$alkylenebiacrylamide (e.g., methylenebisacrylamide), a poly $((C_1-C_{20})$alkenyl)-substituted mono- or poly-$(C_1-C_{20})$alkyl ether (e.g., pentaerythritol allyl ether), and a poly$(C_2-C_2)$alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000.01 wt % to about 5 wt % of the composition of a cured product thereof, about 0.001 wt % to about 0.01 wt %, or about 0.000.01 wt % or less, or about 0.000.05 wt %, 0.000,1, 0.000,5, 0.001, 0.005, 0.01, 0.05, 0.1, 0.5, 1, 2, 3, 4, or about 5 wt % or more.

In some embodiments, the composition or a cured product thereof can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release breaker, such that the surrounding liquid can remain viscous for a suitable amount of time prior to breaking. The breaker can be any suitable breaker; for example, the breaker can be a compound that includes a $Na^+$, $K^+$, $Li^+$, $Zn^+$, $NH_4$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hyperchlorite ion. An enzymatic breaker can be at least one of an alpha or beta amylase, amyloglucosidase, oligoglucosidase, invertase, maltase, cellulase, hemicellulase, and mannanohydrolase. The breaker can be about 0.001 wt % to about 30 wt % of the composition, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The composition, a cured product thereof, or a mixture including the composition or a cured product thereof, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition, a cured product thereof, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition including the aryl component and the amine or epoxide component, or a cured product thereof, can include any suitable downhole fluid. The composition including the aryl component and the amine or epoxide component can be combined with any suitable downhole fluid before, during, or after the placement of the composition in the subterranean formation or the contacting of the composition and the subterranean material. In some examples, the composition including the aryl component and the amine or epoxide component is combined with a downhole fluid above the surface, and then the combined composition is placed in a subterranean formation or contacted with a subterranean material. In another example, the composition including the aryl component and the amine or epoxide component is injected into a subterranean formation to combine with a downhole fluid, and the combined composition is contacted with a subterranean material or is considered to be placed in the subterranean formation. In various examples, at least one of prior to, during, and after the placement of the composition in the subterranean formation or contacting of the subterranean material and the composition, the composition is used in the subterranean formation (e.g., downhole), at least one of alone and in combination with other materials, as a fracturing fluid, spotting fluid, clean-up fluid, completion fluid, remedial treatment fluid, abandonment fluid, pill, cementing fluid, packer fluid, or a combination thereof.

In various embodiments, the composition including the aryl component and the amine or epoxide component, a cured product thereof, or a mixture including the same, can include any suitable downhole fluid, such as an aqueous or oil-based fluid including a fracturing fluid, spotting fluid, clean-up fluid, completion fluid, remedial treatment fluid, abandonment fluid, pill, cementing fluid, packer fluid, or a combination thereof. The placement of the composition in the subterranean formation can include contacting the subterranean material and the mixture. Any suitable weight percent of the composition, cured product thereof, or a mixture including the same, that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt %.

In some embodiments, the composition, a cured product thereof, or a mixture including the same, can include any suitable amount of any suitable material used in a downhole fluid. For example, the composition or a cured product thereof can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, pozzolan lime, or a combination thereof. In various embodiments, the composition or a cured product thereof can include one or more additive components such as: thinner additives such as COLDTROL®, ATC®, OMC 2™, and OMC 42™; RHEMOD™, a viscosifier and suspension agent including a modified fatty acid; additives for providing temporary increased viscosity, such as for shipping (e.g., transport to the well site) and for use in sweeps (for example, additives having the trade name TEMPERUS™ (a modified fatty acid) and VIS-PLUS®, a thixotropic viscosifying polymer blend); TAU-MOD™, a viscosifying/suspension agent including an amorphous/fibrous material; additives for filtration control, for example, ADAPTA®, a high temperature high pressure (HTHP) filtration control agent including a crosslinked copolymer; DURATONE® HT, a filtration control agent that includes an organophilic lignite, more particularly organophilic leonardite; THERMO TONE™, a HTHP filtration control agent including a synthetic polymer; BDF™-366, a HTHP filtration control agent; BDF™-454, a HTHP filtration control agent; LIQUITONE™, a polymeric filtration agent and viscosifier; additives for HTHP emulsion stability, for example, FACTANT™, which includes highly concentrated tall oil derivative; emulsifiers such as LE SUPERMUL™ and EZ MUL® NT, polyaminated fatty acid emulsifiers, and FORTI-MUL®; DRIL TREAT®, an oil wetting agent for heavy fluids; BARACARB®, a sized ground marble bridging agent; BAROID®, a ground barium sulfate weighting agent; BAROLIFT®, a hole sweeping agent; SWEEP-WATE®, a sweep weighting agent; BDF-508, a diamine dimer rheology modifier; GELTONE® II organophilic clay; BAROFIBRE™ O for lost circulation management and seepage loss prevention, including a natural cellulose fiber; STEELSEAL®, a resilient graphitic carbon lost circulation material; HYDRO-PLUG®, a hydratable swelling lost circulation material; lime, which can provide alkalinity and can activate certain emulsifiers; and calcium chloride, which can provide salinity. Any suitable proportion of the composition, cured product thereof, or mixture including the composition or cured product thereof can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more.

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a downhole fluid.

A cement fluid can include an aqueous mixture of at least one of cement and cement kiln dust. The composition including the aryl component and the amine or epoxide component, or a cured product thereof, can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition or a cured product thereof. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a composition including an aryl component and an amine or epoxide component. The system can also include a subterranean formation including the composition therein. In some embodiments, the system includes a cured product of a composition including an aryl component and an amine or epoxide component, and a subterranean formation including the composition therein, such as a consolidated proppant, gravel, or sand pack in the subterranean formation that is consolidated with a cured product of the composition. In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems and apparatus configured for delivering the composition described herein to a subterranean location and for using the composition therein, such as for a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), the tubular containing a composition including an aryl component and an amine or epoxide component.

In some embodiments, the system can include a drillstring disposed in a wellbore, the drillstring including a drill bit at a downhole end of the drillstring. The system can also include an annulus between the drillstring and the wellbore. The system can also include a pump configured to circulate the composition through the drill string, through the drill bit, and back above-surface through the annulus. In some embodiments, the system can include a fluid processing unit configured to process the composition exiting the annulus to generate a cleaned drilling fluid for recirculation through the wellbore.

In various embodiments, the present invention provides an apparatus. The apparatus can be any suitable apparatus that can use or that can be generated by use of the composition or cured product thereof described herein in a subterranean formation, or that can perform or be generated by performance of a method for using the composition or cured product thereof described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

FIG. 1 shows an illustrative schematic of systems and apparatuses that can deliver embodiments of the compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 1, at least part of the composition can, in some embodiments, flow back to wellhead 14 and exit subterranean formation 18. The composition that flows back can be substantially diminished in the concentration of various components therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Composition for Treatment of a Subterranean Formation.

Various embodiments provide a composition for treatment of a subterranean formation. The composition can be any suitable composition that can be used to perform an embodiment of the method for treatment of a subterranean formation described herein. For example, the composition can include an aryl component and an amine or epoxide component. Various embodiments of the present invention provide a cured product of the composition that includes an aryl component and an amine or epoxide component.

In some embodiments, the composition or cured product thereof further includes a downhole fluid. The downhole fluid can be any suitable downhole fluid. In some embodiments, the downhole fluid is a composition for fracturing of a subterranean formation or subterranean material, or a fracturing fluid. The composition can include a proppant or gravel, such as proppant or gravel having a mixture of components including the aryl component and the amine or epoxide component coated thereon.

Method for Preparing a Composition for Treatment of a Subterranean Formation.

In various embodiments, the present invention provides a method for preparing a composition for treatment of a subterranean formation. The method can be any suitable method that produces an embodiment of the composition described herein or a cured product thereof. For example, the method can include forming a composition including an aryl component and an amine or epoxide component, or a cured product thereof.

EXAMPLES

Various embodiments of the present invention can be better understood by reference to the following Examples which are offered by way of illustration. The present invention is not limited to the Examples given herein.

Example 1

Terephthaloyl Chloride and Modified Cycloaliphatic Amine Adduct

Figure 2:
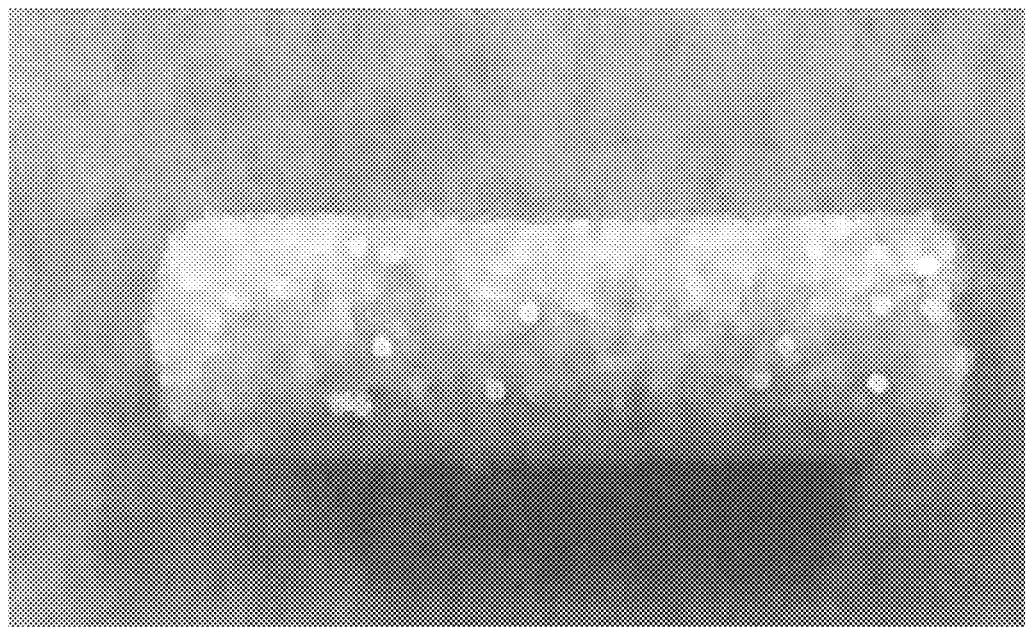
FIG. 2 is a photograph of a consolidated sand pack formed by curing a composition, in accordance with various embodiments.

Terephthaloyl chloride was mixed into isopropanol at a 50 wt % concentration. A 1:1 by volume mixture of the terephthaloyl chloride solution and a hardener (30 wt % methanol, 60 wt % modified cycloaliphatic amine adduct, and 10 wt % phosphate ester) was mixed to form a resin system. This resin system was then dry coated onto 20/40-mesh Unipac sand at 2 wt % coating concentration. The coated sand was packed into a syringe and placed at 200° F. temperature overnight for curing. A completely consolidated sand pack was formed, as shown in FIG. 2.

Example 2

Terephthaloyl Chloride and Hydrophobically Modified Polyethyleneimine (PEI)

Figure 3:
FIG. 3 is a photograph of a consolidated sand pack formed by curing a composition, in accordance with various embodiments.

Terephthaloyl chloride was mixed into isopropanol at a 50 wt % concentration. A 1:1 by volume mixture of the terephthaloyl chloride solution and hydrophobically modified polyethyleneimine (PEI) was mixed to form a resin system. This resin system was then dry coated onto 20/20-mesh Unipac sand at 2 wt % coating concentration. The coated sand was packed into a syringe and placed at 200° F. temperature overnight for curing. A completely consolidated sand pack was formed, as shown in FIG. 3.

Example 3

Terephthalic Acid and Bisphenol A Diglycidyl Ether

Figure 4:
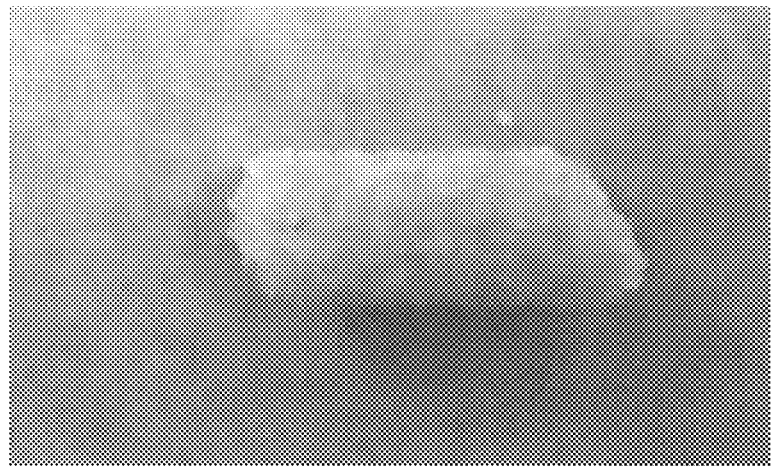
FIG. 4 is a photograph of a consolidated sand pack formed by curing a composition, in accordance with various embodiments.

Terephthalic acid was mixed into dimethylsulfoxide (DMSO) at a 10 wt % concentration. A 4:1 by volume mixture of the terephthalic acid solution and a resin solution (60 wt % bisphenol A diglycidyl ether, 30 wt % butyl glycidyl ether, and 10 wt % butyl lactate) was mixed to form a resin system. This resin system was then dry coated onto 20/40-mesh Unipac sand at 2 wt % coating concentration. The coated sand was packed into a syringe and placed at 200° F. temperature overnight for curing. A completely consolidated sand pack was formed, as shown in FIG. 4.

Example 4

Terephthalic Acid and Epoxysilane

Figure 5:
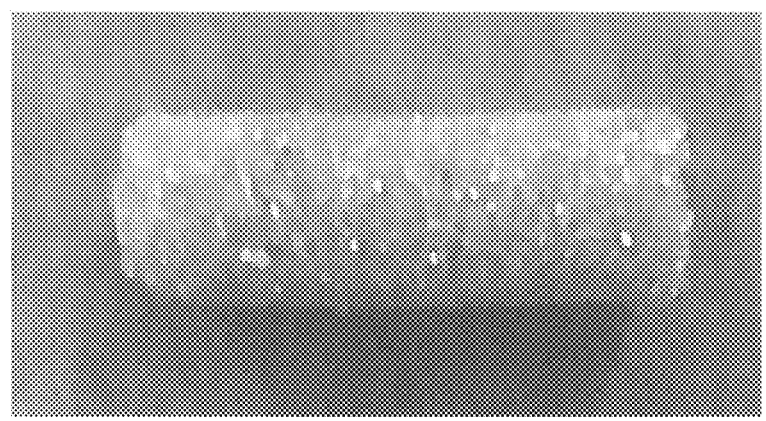
FIG. 5 is a photograph of a consolidated sand pack formed by curing a composition, in accordance with various embodiments.

Terephthalic acid was mixed into water at 10 wt % concentration. The mixture was brought to pH 12 using MO-67™ to solubilize the terephthalic acid in the water. A 4:1 by volume mixture of the terephthalic acid solution and epoxysilane agent ((3-glycidyloxypropyl)trimethoxysilane in water at 50 wt % concentration) was mixed to form a resin system. The resin system was then dry coated onto 20/40-mesh Unipac sand at 2 wt % coating concentration. The coated sand was packed into a syringe and placed at 200° F. temperature overnight for curing. A completely consolidated sand pack was formed, as shown in FIG. 5.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:
  obtaining or providing a composition comprising
    an aryl component comprising at least one of an aryldicarboxylic acid, an ester thereof, a salt thereof, and an acid halide thereof; and
    an amine or epoxide component comprising at least one of a linear diepoxide, a poly(alkylamine), or a combination thereof; and
    an alkoxy- or hydroxy-substituted silane comprising an epoxy group, an alkoxy- or hydroxy-substituted silane comprising an amine group, or a combination thereof; and
  placing the composition in a subterranean formation.

Embodiment 2 provides the method of Embodiment 1, wherein the obtaining or providing of the composition occurs above-surface.

Embodiment 3 provides the method of any one of Embodiments 1-2, wherein the obtaining or providing of the composition occurs in the subterranean formation.

Embodiment 4 provides the method of any one of Embodiments 1-3, further comprising consolidating particulates in the subterranean formation with a cured product of the composition.

Embodiment 5 provides the method of any one of Embodiments 1-4, further comprising at least partially curing the composition, to form a cured product of the composition.

Embodiment 6 provides the method of Embodiment 5, wherein the curing occurs in the subterranean formation.

Embodiment 7 provides the method of any one of Embodiments 1-6, wherein the composition further comprises at least one of proppant and gravel.

Embodiment 8 provides the method of Embodiment 7, wherein the proppant or gravel is about 1 wt % to about 90 wt % of the composition.

Embodiment 9 provides the method of any one of Embodiments 7-8, wherein the proppant or gravel is about 5 wt % to about 70 wt % of the composition.

Embodiment 10 provides the method of any one of Embodiments 7-9, wherein the composition is at least partially coated on the proppant or gravel.

Embodiment 11 provides the method of any one of Embodiments 1-10, comprising placing the composition in at least one of a fracture and flowpath in the subterranean formation.

Embodiment 12 provides the method of Embodiment 11, wherein the fracture is present in the subterranean formation when the composition is placed in the subterranean formation.

Embodiment 13 provides the method of any one of Embodiments 11-12, wherein the method comprises forming the fracture or flowpath.

Embodiment 14 provides the method of any one of Embodiments 1-13, further comprising fracturing the subterranean formation to form at least one fracture in the subterranean formation.

Embodiment 15 provides the method of any one of Embodiments 1-14, wherein the aryl component is about 0.001 wt % to about 50 wt % of the composition.

Embodiment 16 provides the method of any one of Embodiments 1-15, wherein the aryl component is about 0.01 wt % to about 30 wt % of the composition.

Embodiment 17 provides the method of any one of Embodiments 1-16, wherein the amine or epoxide component is about 0.001 wt % to about 50 wt % of the composition.

Embodiment 18 provides the method of any one of Embodiments 1-17, wherein the amine or epoxide component is about 0.01 wt % to about 30 wt % of the composition.

Embodiment 19 provides the method of any one of Embodiments 1-18, wherein the composition further comprises a carrier liquid.

Embodiment 20 provides the method of any one of Embodiments 1-19, wherein if none of the poly(alkylamine) is present in the composition, at least some of the aryldicarboxylic acid, ester thereof, or salt thereof is present in the composition.

Embodiment 21 provides the method of any one of Embodiments 1-20, wherein the aryldicarboxylic acid, ester thereof, salt thereof, or acid halide thereof has the following structure:

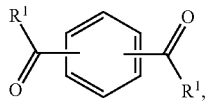

wherein $R^1$ is selected from the group consisting of —OH, —$OR^2$, —$O^-$[counterion], and -halide, wherein at each occurrence $R^2$ is a substituted or unsubstituted ($C_1$-$C_{30}$)hydrocarbyl interrupted by 0, 1, 2, or 3 groups selected from —O—, substituted or unsubstituted —NH—, and —S—.

Embodiment 22 provides the method of Embodiment 21, wherein the aryldicarboxylic acid, ester thereof, salt thereof, or acid halide thereof has the following structure:

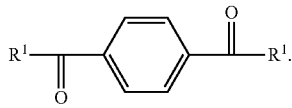

Embodiment 23 provides the method of any one of Embodiments 1-22, wherein the aryl component comprises at least one of:

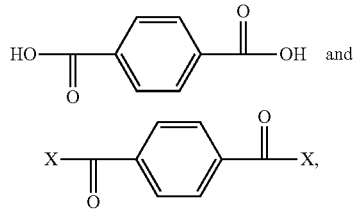

wherein X is halide.

Embodiment 24 provides the method of any one of Embodiments 1-23, wherein the linear diepoxide has the following structure:

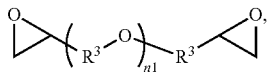

wherein
at each occurrence $R^3$ is independently a substituted or unsubstituted ($C_1$-$C_{30}$)hydrocarbylene, and
n1 is about 0 to about 100,000.

Embodiment 25 provides the method of Embodiment 24, wherein at each occurrence $R^3$ is independently a ($C_1$-$C_{10}$)alkylene.

Embodiment 26 provides the method of any one of Embodiments 24-25, wherein $R^3$ is methylene.

Embodiment 27 provides the method of any one of Embodiments 24-26, wherein n1 is 1.

Embodiment 28 provides the method of any one of Embodiments 1-27, wherein the linear diepoxide has the following structure:

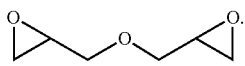

Embodiment 29 provides the method of any one of Embodiments 1-28, wherein the linear diepoxide has the following structure:

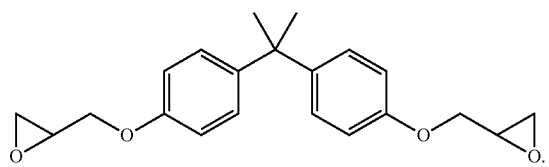 [SMILES: CC(C)(c1ccc(OCC2CO2)cc1)c1ccc(OCC2CO2)cc1]

Embodiment 30 provides the method of any one of Embodiments 1-29, wherein the alkoxy- or hydroxy-substituted silane comprising the epoxy group has the following structure:

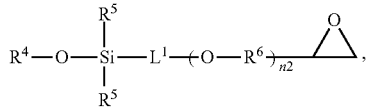

wherein
$R^4$ is independently selected from the group consisting of —H and a substituted or unsubstituted ($C_1$-$C_{30}$)hydrocarbyl interrupted by 0, 1, 2, or 3 groups independently chosen from —O— and —S—,
at each occurrence, $R^5$ is independently selected from the group consisting of a substituted or unsubstituted ($C_1$-$C_{30}$)hydrocarbyl interrupted by 0, 1, 2, or 3 groups independently chosen from —O— and —S—, and a substituted or unsubstituted ($C_1$-$C_{30}$)hydrocarbyloxy interrupted by 0, 1, 2, or 3 groups independently chosen from —O— and —S—,
at each occurrence, $R^6$ is independently a substituted or unsubstituted ($C_1$-$C_{30}$)hydrocarbylene,
$L^1$ is a substituted or unsubstituted ($C_1$-$C_{30}$)hydrocarbylene, and
n2 is about 0 to about 100,000.

Embodiment 31 provides the method of Embodiment 30, wherein $R^4$ is selected from the group consisting of —H and a ($C_1$-$C_2$)alkyl.

Embodiment 32 provides the method of any one of Embodiments 30-31, wherein $R^4$ is ($C_1$-$C_5$)alkyl.

Embodiment 33 provides the method of any one of Embodiments 30-32, wherein $R^4$ is —$CH_3$.

Embodiment 34 provides the method of any one of Embodiments 30-33, wherein at each occurrence, $R^5$ is ($C_1$-$C_2$)alkoxy.

Embodiment 35 provides the method of any one of Embodiments 30-34, wherein at each occurrence, $R^5$ is —$OCH_3$.

Embodiment 36 provides the method of any one of Embodiments 30-35, wherein at each occurrence, $R^6$ is ($C_1$-$C_{20}$)alkylene.

Embodiment 37 provides the method of any one of Embodiments 30-36, wherein at each occurrence, $R^6$ is ($C_1$-$C_5$)alkylene.

Embodiment 38 provides the method of any one of Embodiments 30-37, wherein at each occurrence, $R^6$ is methylene.

Embodiment 39 provides the method of any one of Embodiments 30-38, wherein $L^1$ is ($C_1$-$C_{20}$)alkylene.

Embodiment 40 provides the method of any one of Embodiments 30-39, wherein $L^1$ is propylene.

Embodiment 41 provides the method of any one of Embodiments 30-40, wherein n2 is 1.

Embodiment 42 provides the method of any one of Embodiments 30-41, wherein the alkoxy- or hydroxy-substituted silane comprising the epoxy group has the following structure:

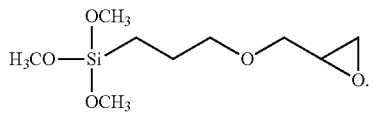

Embodiment 43 provides the method of any one of Embodiments 1-42, wherein the poly(alkylamine) has the following structure:

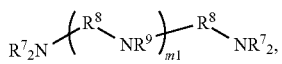

wherein at each occurrence, $R^7$ is selected from the group consisting of —H and a substituted or unsubstituted ($C_1$-$C_{30}$)hydrocarbyl, at each occurrence, $R^8$ is a substituted or unsubstituted ($C_1$-$C_{30}$)hydrocarbylene, at each occurrence, $R^9$ is selected from the group consisting of —H, a substituted or unsubstituted ($C_1$-$C_{30}$) hydrocarbyl, and a substituted or unsubstituted ($C_1$-$C_{30}$)hydrocarbylene terminated with —$NR^9{}_2$, and m1 is about 0 to about 100,000.

Embodiment 44 provides the method of Embodiment 43, wherein at each occurrence, $R^7$ is selected from the group consisting of —H and a substituted or unsubstituted ($C_1$-$C_{30}$)alkyl.

Embodiment 45 provides the method of any one of Embodiments 43-44, wherein at each occurrence, $R^7$ is selected from the group consisting of —H and a ($C_1$-$C_{30}$) alkyl.

Embodiment 46 provides the method of any one of Embodiments 43-45, wherein at each occurrence, $R^8$ is ($C_1$-$C_{20}$)alkylene.

Embodiment 47 provides the method of any one of Embodiments 43-46, wherein at each occurrence, $R^8$ is ($C_1$-$C_5$)alkylene.

Embodiment 48 provides the method of any one of Embodiments 43-47, wherein at each occurrence, $R^8$ is ethylene.

Embodiment 49 provides the method of any one of Embodiments 43-48, wherein at each occurrence, $R^9$ is selected from the group consisting of —H, a substituted or unsubstituted ($C_1$-$C_{30}$)alkyl, and a substituted or unsubstituted ($C_1$-$C_{30}$)alkylene terminated with —$NR^9{}_2$.

Embodiment 50 provides the method of any one of Embodiments 43-49, wherein at each occurrence, $R^9$ is selected from the group consisting of —H, a ($C_1$-$C_{30}$)alkyl, and a ($C_2$-$C_{10}$)alkylene terminated with —$NR^9{}_2$.

Embodiment 51 provides the method of any one of Embodiments 43-50, wherein at each occurrence, $R^9$ is selected from the group consisting of —H, a ($C_1$-$C_{30}$)alkyl, and —$(CH_2)_2$—$NR^9{}_2$.

Embodiment 52 provides the method of any one of Embodiments 43-51, wherein m1 is about 1 to about 50,000.

Embodiment 53 provides the method of any one of Embodiments 43-52, wherein the poly(alkylamine) is polyethyleneimine.

Embodiment 54 provides the method of any one of Embodiments 43-53, wherein the poly(alkylamine) is hydrophobically-modified polyethyleneimine.

Embodiment 55 provides the method of any one of Embodiments 1-54, wherein the alkoxy- or hydroxy-substituted silane comprising the amine group has the following structure:

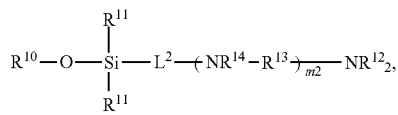

wherein $R^{10}$ is independently selected from the group consisting of —H and a substituted or unsubstituted ($C_1$-$C_{30}$)hydrocarbyl interrupted by 0, 1, 2, or 3 groups independently chosen from —O—, substituted or unsubstituted —NH—, and —S—, at each occurrence, $R^{11}$ is independently selected from the group consisting of a substituted or unsubstituted ($C_1$-$C_{30}$)hydrocarbyl interrupted by 0, 1, 2, or 3 groups independently chosen from —O— and —S—, and a substituted or unsubstituted ($C_1$-$C_{30}$)hydrocarbyloxy interrupted by 0, 1, 2, or 3 groups independently chosen from —O— and —S—, $R^{12}$ is selected from the group consisting of —H and a substituted or unsubstituted ($C_1$-$C_{30}$)hydrocarbyl, $R^{13}$ is a substituted or unsubstituted ($C_1$-$C_{30}$)hydrocarbylene, $R^{14}$ is selected from the group consisting of —H, a substituted or unsubstituted ($C_1$-$C_{30}$)hydrocarbyl, and a substituted or unsubstituted ($C_1$-$C_{30}$)hydrocarbylene terminated with —$NR^{14}{}_2$, $L^2$ is a substituted or unsubstituted ($C_1$-$C_{30}$)hydrocarbylene, and m2 is about 0 to about 100,000.

Embodiment 56 provides the method of Embodiment 55, wherein $R^{10}$ is selected from the group consisting of —H and a ($C_1$-$C_{20}$)alkyl.

Embodiment 57 provides the method of any one of Embodiments 55-56, wherein $R^{10}$ is ($C_1$-$C_5$)alkyl.

Embodiment 58 provides the method of any one of Embodiments 55-57, wherein $R^{10}$ is —$CH_3$.

Embodiment 59 provides the method of any one of Embodiments 55-58, wherein at each occurrence, $R^{11}$ is ($C_1$-$C_{20}$)alkoxy.

Embodiment 60 provides the method of any one of Embodiments 55-59, wherein at each occurrence, $R^{11}$ is —$OCH_3$.

Embodiment 61 provides the method of any one of Embodiments 55-60, wherein $R^{12}$ is selected from the group consisting of —H and a substituted or unsubstituted ($C_1$-$C_{30}$)alkyl.

Embodiment 62 provides the method of any one of Embodiments 55-61, wherein $R^{12}$ is selected from the group consisting of —H and a ($C_1$-$C_{30}$)alkyl.

Embodiment 63 provides the method of any one of Embodiments 55-62, wherein $R^{13}$ is ($C_1$-$C_{20}$)alkylene.

Embodiment 64 provides the method of any one of Embodiments 55-63, wherein $R^{13}$ is ($C_1$-$C_5$)alkylene.

Embodiment 65 provides the method of any one of Embodiments 55-64, wherein $R^{13}$ is ethylene.

Embodiment 66 provides the method of any one of Embodiments 55-65, wherein $R^{14}$ is selected from the group consisting of —H, a substituted or unsubstituted $(C_1-C_{30})$alkyl, and a substituted or unsubstituted $(C_1-C_{30})$alkylene terminated with —$NR^{14}_2$.

Embodiment 67 provides the method of any one of Embodiments 55-66, wherein $R^{14}$ is selected from the group consisting of —H, a $(C_1-C_{30})$alkyl, and a $(C_2-C_{10})$alkylene terminated with —$NR^{14}_2$.

Embodiment 68 provides the method of any one of Embodiments 55-67, wherein $R^{14}$ is selected from the group consisting of —H, a $(C_1-C_{30})$alkyl, and —$(CH_2)_2$—$NR^{14}_2$.

Embodiment 69 provides the method of any one of Embodiments 55-68, wherein $L^2$ is $(C_1-C_{20})$alkylene.

Embodiment 70 provides the method of any one of Embodiments 55-69, wherein $L^2$ is $(C_1-C_5)$alkylene.

Embodiment 71 provides the method of any one of Embodiments 55-70, wherein $L^2$ is propylene.

Embodiment 72 provides the method of any one of Embodiments 55-71, wherein m2 is 1.

Embodiment 73 provides the method of any one of Embodiments 55-72, wherein the alkoxy- or hydroxy-substituted silane comprising the amine group has the following structure:

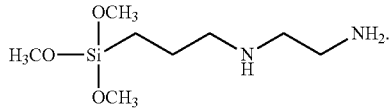

Embodiment 74 provides the method of any one of Embodiments 1-73, wherein the composition comprises the aryldicarboxylic acid, salt thereof, or ester thereof and the linear diepoxide.

Embodiment 75 provides the method of Embodiment 74, further comprising curing the composition to form a cured product comprising a repeating unit having the structure:

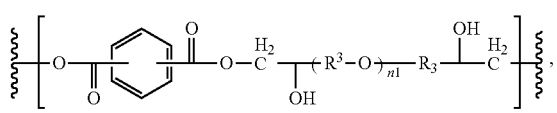

wherein
at each occurrence, $R^3$ is independently a substituted or unsubstituted $(C_1-C_{30})$hydrocarbylene, and
n1 is about 0 to about 100,000.

Embodiment 76 provides the method of any one of Embodiments 74-75, further comprising curing the composition to form a cured product comprising a repeating unit having the structure:

Embodiment 77 provides the method of any one of Embodiments 1-76, wherein the composition comprises the aryldicarboxylic acid, salt thereof, or ester thereof and the alkoxy- or hydroxy-substituted silane comprising the epoxy group.

Embodiment 78 provides the method of Embodiment 77, further comprising curing the composition to form a cured product having the structure:

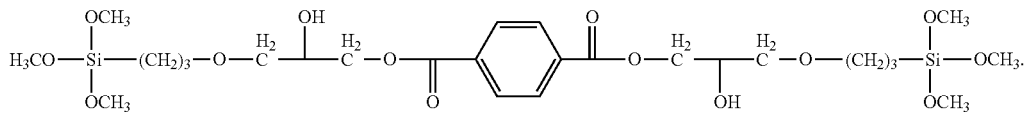

wherein
$R^4$ is independently selected from the group consisting of —H and a substituted or unsubstituted $(C_1-C_{30})$hydrocarbyl interrupted by 0, 1, 2, or 3 groups independently chosen from —O— and —S—,
at each occurrence, $R^5$ is independently selected from the group consisting of a substituted or unsubstituted $(C_1-C_{30})$hydrocarbyl interrupted by 0, 1, 2, or 3 groups independently chosen from —O— and —S—, and a substituted or unsubstituted $(C_1-C_{30})$hydrocarbyloxy interrupted by 0, 1, 2, or 3 groups independently chosen from —O— and —S—,
$L^1$ is a substituted or unsubstituted $(C_1-C_{30})$hydrocarbylene,
at each occurrence, $R^6$ is independently a substituted or unsubstituted $(C_1-C_{30})$hydrocarbylene, and
n2 is about 0 to about 100,000.

Embodiment 79 provides the method of any one of Embodiments 77-78, further comprising curing the composition to form a cured product having the structure:

Embodiment 80 provides the method of any one of Embodiments 1-79, wherein the composition comprises the aryldicarboxylic acid, salt thereof, or ester thereof, the alkoxy- or hydroxy-substituted silane comprising the epoxy group, and the linear diepoxide.

Embodiment 81 provides the method of Embodiment 80, further comprising curing the composition to form a cured product having the structure:

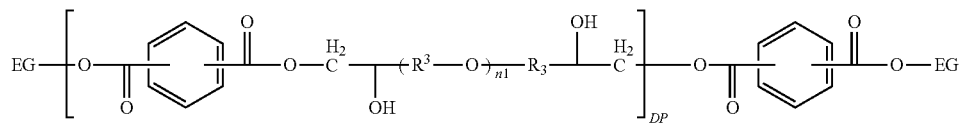

wherein
EG has the following structure:

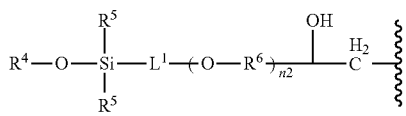

at each occurrence $R^3$ is independently a substituted or unsubstituted $(C_1$-$C_{30})$hydrocarbylene, n1 is about 0 to about 100,000, $R^4$ is independently selected from the group consisting of —H and a substituted or unsubstituted $(C_1$-$C_{30})$hydrocarbyl interrupted by 0, 1, 2, or 3 groups independently chosen from —O— and —S—, at each occurrence, $R^5$ is independently selected from the group consisting of a substituted or unsubstituted $(C_1$-$C_{30})$hydrocarbyl interrupted by 0, 1, 2, or 3 groups independently chosen from —O— and —S—, and a substituted or unsubstituted $(C_1$-$C_{30})$hydrocarbyloxy interrupted by 0, 1, 2, or 3 groups independently chosen from —O— and —S—, at each occurrence, $R^6$ is independently a substituted or unsubstituted $(C_1$-$C_{30})$hydrocarbylene, and n2 is about 0 to about 100,000.

Embodiment 82 provides the method of any one of Embodiments 80-81, further comprising curing the composition to form a cured product having the structure:

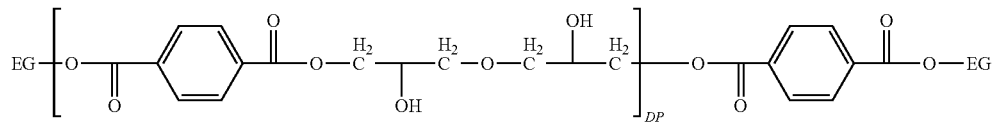

wherein EG has the following structure:

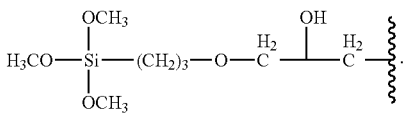

Embodiment 83 provides the method of any one of Embodiments 1-82, wherein the composition comprises the aryldicarboxylic acid, salt thereof, ester thereof, or acid halide thereof, and the poly(alkylamine).

Embodiment 84 provides the method of Embodiment 83, further comprising curing the composition to form a cured product comprising a repeating unit having the structure:

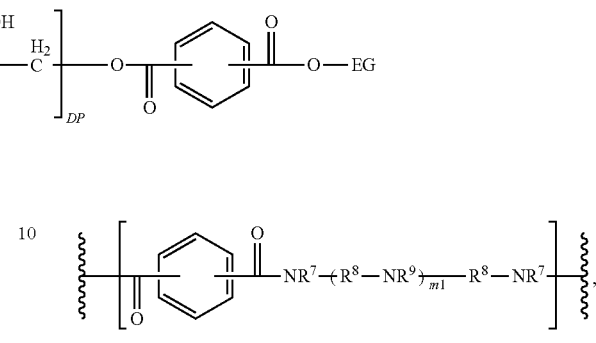

wherein at each occurrence, $R^7$ is selected from the group consisting of —H, a substituted or unsubstituted $(C_1$-$C_{30})$hydrocarbyl, and —CL, at each occurrence, $R^8$ is a substituted or unsubstituted $(C_1$-$C_{30})$hydrocarbylene, and at each occurrence, $R^9$ is selected from the group consisting of —H, a substituted or unsubstituted $(C_1$-$C_{30})$hydrocarbyl, a substituted or unsubstituted $(C_1$-$C_{30})$hydrocarbylene terminated with at least one of —$NR^9_2$, —$NR^9CL$, and —$N(CL)_2$, m1 is about 0 to about 100,000, and CL is an inter- or intra-molecular bond to the non-$NR^7$-bound carbonyl group of the repeating unit.

Embodiment 85 provides the method of any one of Embodiments 83-84, further comprising curing the composition to form a cured product comprising a repeating unit having the structure:

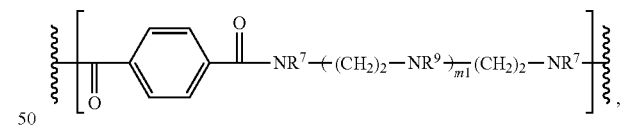

wherein at each occurrence, $R^7$ is selected from the group consisting of —H, a substituted or unsubstituted $(C_1$-$C_{30})$hydrocarbyl, and —CL, at each occurrence, $R^9$ is selected from the group consisting of —H, a substituted or unsubstituted $(C_1$-$C_{30})$hydrocarbyl, and a substituted or unsubstituted $(C_1$-$C_{30})$hydrocarbylene terminated with at least one of —$NR^9_2$, —$NR^9CL$, and —$N(CL)_2$, m1 is about 0 to about 100,000, and CL is an inter- or intra-molecular bond to the non-$NR^7$-bound carbonyl group of the repeating unit.

Embodiment 86 provides the method of any one of Embodiments 1-85, wherein the composition comprises the aryldicarboxylic acid, salt thereof, ester thereof, or acid halide thereof, and the alkoxy- or hydroxy-substituted silane comprising the amine group.

Embodiment 87 provides the method of Embodiment 86, further comprising curing the composition to form a cured product having the structure:

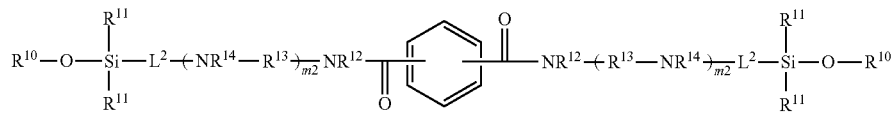

wherein
- $R^{10}$ is independently selected from the group consisting of —H and a substituted or unsubstituted ($C_1$-$C_{30}$)hydrocarbyl interrupted by 0, 1, 2, or 3 groups independently chosen from —O—, substituted or unsubstituted —NH—, and —S—,
- at each occurrence, $R^{11}$ is independently selected from the group consisting of a substituted or unsubstituted ($C_1$-$C_{30}$)hydrocarbyl interrupted by 0, 1, 2, or 3 groups independently chosen from —O— and —S—, and a substituted or unsubstituted ($C_1$-$C_{30}$)hydrocarbyloxy interrupted by 0, 1, 2, or 3 groups independently chosen from —O— and —S—,
- $L^2$ is a substituted or unsubstituted ($C_1$-$C_{30}$)hydrocarbylene,
- $R^{12}$ is selected from the group consisting of —H, a substituted or unsubstituted ($C_1$-$C_{30}$)hydrocarbyl, and —CL,
- $R^{13}$ is a substituted or unsubstituted ($C_1$-$C_{30}$)hydrocarbylene,
- $R^{14}$ is selected from the group consisting of —H, a substituted or unsubstituted ($C_1$-$C_{30}$)hydrocarbyl, and a substituted or unsubstituted ($C_1$-$C_{30}$)hydrocarbylene terminated with at least one of —$NR^{14}_2$, —$NR^{14}CL$, and —$N(CL)_2$,
- m2 is about 0 to about 100,000, and
- CL is an inter- or intra-molecular bond to a carbonyl group from the aryldicarboxylic acid, salt thereof, ester thereof, or acid halide thereof incorporated in the cured product.

Embodiment 88 provides the method of any one of Embodiments 86-87, further comprising curing the composition to form a cured product having the structure:

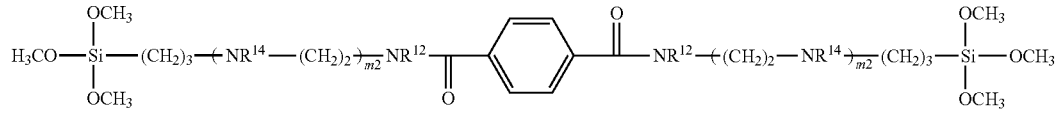

wherein
- $R^{12}$ is selected from the group consisting of —H, a substituted or unsubstituted ($C_1$-$C_{30}$)hydrocarbyl, and —CL,
- $R^{14}$ is selected from the group consisting of —H, a substituted or unsubstituted ($C_1$-$C_{30}$)hydrocarbyl, and a substituted or unsubstituted ($C_1$-$C_{30}$)hydrocarbylene terminated with at least one of —$NR^{14}_2$, —$NR^{14}CL$, and —$N(CL)_2$,
- m2 is about 0 to about 100,000, and
- CL is an inter- or intra-molecular bond to a carbonyl group from the aryldicarboxylic acid, salt thereof, ester thereof, or acid halide thereof incorporated in the cured product.

Embodiment 89 provides the method of any one of Embodiments 1-88, wherein the composition comprises the aryldicarboxylic acid, salt thereof, ester thereof, or acid halide thereof, the alkoxy- or hydroxy-substituted silane comprising the amine group, and the linear diepoxide.

Embodiment 90 provides the method of Embodiment 89, further comprising curing the composition to form a cured product comprising a repeating unit having the structure:

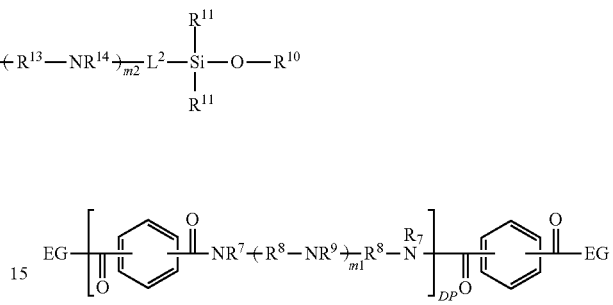

wherein
EG has the following structure:

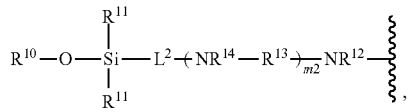

- at each occurrence, $R^7$ is selected from the group consisting of —H, a substituted or unsubstituted ($C_1$-$C_{30}$) hydrocarbyl, and —CL,
- at each occurrence, $R^8$ is a substituted or unsubstituted ($C_1$-$C_{30}$)hydrocarbylene,
- at each occurrence, $R^9$ is selected from the group consisting of —H, a substituted or unsubstituted ($C_1$-$C_{30}$) hydrocarbyl, and a substituted or unsubstituted ($C_1$-$C_{30}$)hydrocarbylene terminated with at least one of —$NR^9_2$, —$NR^9CL$, and —$N(CL)_2$,
- m1 is about 0 to about 100,000,
- at each occurrence, $L^2$ is a substituted or unsubstituted ($C_1$-$C_{30}$)hydrocarbylene,
- at each occurrence, $R^{10}$ is independently selected from the group consisting of —H and a substituted or unsubstituted ($C_1$-$C_{30}$)hydrocarbyl interrupted by 0, 1, 2, or 3 groups independently chosen from —O—, substituted or unsubstituted —NH—, and —S—,
- at each occurrence, $R^{11}$ is independently selected from the group consisting of a substituted or unsubstituted ($C_1$-$C_{30}$)hydrocarbyl interrupted by 0, 1, 2, or 3 groups independently chosen from —O— and —S—, and a substituted or unsubstituted ($C_1$-$C_{30}$)hydrocarbyloxy interrupted by 0, 1, 2, or 3 groups independently chosen from —O— and —S—,
- at each occurrence, $R^{12}$ is selected from the group consisting of —H, a substituted or unsubstituted ($C_1$-$C_{30}$) hydrocarbyl, and —CL,
- at each occurrence, $R^{13}$ is independently a substituted or unsubstituted ($C_1$-$C_{30}$)hydrocarbylene,
- $R^{14}$ is selected from the group consisting of —H, a substituted or unsubstituted ($C_1$-$C_{30}$)hydrocarbyl, and a substituted or unsubstituted ($C_1$-$C_{30}$)hydrocarbylene terminated with at least one of —$NR^{14}_2$, —$NR^{14}CL$, and —$N(CL)_2$, m2 is about 0 to about 100,000, and CL is an inter- or intra-molecular bond to a carbonyl group from the aryldicarboxylic acid, salt thereof, ester thereof, or acid halide thereof incorporated in the cured product.

Embodiment 91 provides the method of any one of Embodiments 89-90, further comprising curing the composition to form a cured product comprising a repeating unit having the structure:

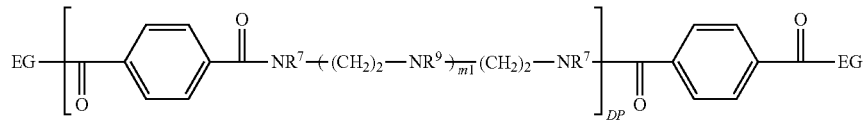

wherein
EG has the following structure:

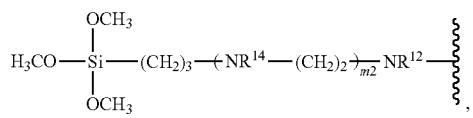

at each occurrence, $R^7$ is selected from the group consisting of —H, a substituted or unsubstituted ($C_1$-$C_{30}$) hydrocarbyl, and —CL, at each occurrence, $R^9$ is selected from the group consisting of —H, a substituted or unsubstituted ($C_1$-$C_{30}$) hydrocarbyl, and a substituted or unsubstituted ($C_1$-$C_{30}$)hydrocarbylene terminated with at least one of —$NR^9{}_2$, —$NR^9CL$, and —$N(CL)_2$, m1 is about 0 to about 100,000, at each occurrence, $R^{12}$ is selected from the group consisting of —H, a substituted or unsubstituted ($C_1$-$C_{30}$) hydrocarbyl, and —CL, $R^{14}$ is selected from the group consisting of —H, a substituted or unsubstituted ($C_1$-$C_{30}$)hydrocarbyl, and a substituted or unsubstituted ($C_1$-$C_{30}$)hydrocarbylene terminated with at least one of —$NR^{14}{}_2$, —$NR^{14}CL$, —$N(CL)_2$, m2 is about 0 to about 100,000, and CL is an inter- or intra-molecular bond to a carbonyl group from the aryldicarboxylic acid, salt thereof, ester thereof, or acid halide thereof incorporated in the cured product.

Embodiment 92 provides the method of any one of Embodiments 1-91, wherein the composition further comprises a silane coupling agent.

Embodiment 93 provides the method of any one of Embodiments 1-92, wherein the composition further comprises a surfactant.

Embodiment 94 provides the method of any one of Embodiments 1-93, wherein the composition further comprises a hydrolyzable ester.

Embodiment 95 provides the method of any one of Embodiments 1-94, wherein the composition further comprises at least one tackifier.

Embodiment 96 provides the method of any one of Embodiments 1-95, wherein the composition further comprises a curing agent.

Embodiment 97 provides the method of any one of Embodiments 1-96, further comprising combining the composition with an aqueous or oil-based fluid comprising a fracturing fluid, spotting fluid, clean-up fluid, completion fluid, remedial treatment fluid, abandonment fluid, pill, cementing fluid, packer fluid, or a combination thereof, to form a mixture, wherein the placing the composition in the subterranean formation comprises placing the mixture in the subterranean formation.

Embodiment 98 provides the method of any one of Embodiments 1-97, wherein at least one of prior to, during, and after the placing of the composition in the subterranean formation, the composition is used in the subterranean formation, at least one of alone and in combination with other materials, as a fracturing fluid, spotting fluid, clean-up fluid, completion fluid, remedial treatment fluid, abandonment fluid, pill, cementing fluid, packer fluid, or a combination thereof.

Embodiment 99 provides the method of any one of Embodiments 1-98, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 100 provides a system for performing the method of any one of Embodiments 1-99, the system comprising:

a tubular disposed in the subterranean formation; and a pump configured to pump the composition in the subterranean formation through the tubular.

Embodiment 101 provides a method of treating a subterranean formation, the method comprising:

obtaining or providing a composition comprising about 0.001 wt % to about 50 wt % of an aryl component having the following structure:

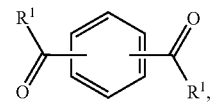

wherein $R^1$ is selected from the group consisting of —OH, —$OR^2$, —$O^-$[counterion], and -halide, wherein at each occurrence $R^2$ is a substituted or unsubstituted ($C_1$-$C_{30}$)hydrocarbyl interrupted by 0, 1, 2, or 3 groups selected from —O—, substituted or unsubstituted —NH—, and —S—; and about 0.001 wt % to about 50 wt % of an amine or epoxide component comprising at least one of A and B:

A) a linear diepoxide having the following structure:

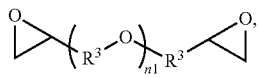

wherein
at each occurrence $R^3$ is independently a substituted or unsubstituted $(C_1$-$C_3)$hydrocarbylene, and
n1 is about 0 to about 100,000,
a poly(akylamine) having the following structure:

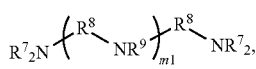

wherein
at each occurrence, $R^7$ is selected from the group consisting of —H and a substituted or unsubstituted $(C_1$-$C_{30})$hydrocarbyl,
at each occurrence, $R^8$ is a substituted or unsubstituted $(C_1$-$C_3)$hydrocarbylene,
at each occurrence, $R^9$ is selected from the group consisting of —H, a substituted or unsubstituted $(C_1$-$C_{30})$hydrocarbyl, and a substituted or unsubstituted $(C_1$-$C_{30})$hydrocarbylene terminated with —$NR^9{}_2$, and
m1 is about 0 to about 100,000, or
a combination thereof;

B) an alkoxy- or hydroxy-substituted silane comprising an epoxy group having the structure:

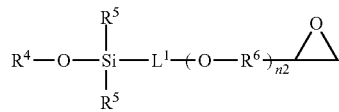

wherein
$R^4$ is independently selected from the group consisting of —H and a substituted or unsubstituted $(C_1$-$C_{30})$hydrocarbyl interrupted by 0, 1, 2, or 3 groups independently chosen from —O— and —S—,
at each occurrence, $R^5$ is independently selected from the group consisting of a substituted or unsubstituted $(C_1$-$C_{30})$hydrocarbyl interrupted by 0, 1, 2, or 3 groups independently chosen from —O— and —S—, and a substituted or unsubstituted $(C_1$-$C_{30})$hydrocarbyloxy interrupted by 0, 1, 2, or 3 groups independently chosen from —O— and —S—,
at each occurrence, $R^6$ is independently a substituted or unsubstituted $(C_1$-$C_{30})$hydrocarbylene,
$L^1$ is a substituted or unsubstituted $(C_1$-$C_{30})$hydrocarbylene, and n2 is about 0 to about 100,000,
an alkoxy- or hydroxy-substituted silane comprising an amine group having the structure:

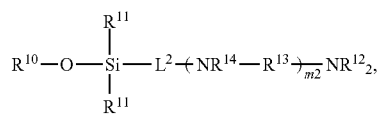

wherein
$R^{10}$ is independently selected from the group consisting of —H and a substituted or unsubstituted $(C_1$-$C_{30})$hydrocarbyl interrupted by 0, 1, 2, or 3 groups independently chosen from —O—, substituted or unsubstituted —NH—, and —S—,
at each occurrence, $R^{11}$ is independently selected from the group consisting of a substituted or unsubstituted $(C_1$-$C_{30})$hydrocarbyl interrupted by 0, 1, 2, or 3 groups independently chosen from —O— and —S—, and a substituted or unsubstituted $(C_1$-$C_{30})$hydrocarbyloxy interrupted by 0, 1, 2, or 3 groups independently chosen from —O— and —S—,
$R^{12}$ is selected from the group consisting of —H and a substituted or unsubstituted $(C_1$-$C_{30})$hydrocarbyl,
$R^{13}$ is a substituted or unsubstituted $(C_1$-$C_{30})$hydrocarbylene,
$R^{14}$ is selected from the group consisting of —H, a substituted or unsubstituted $(C_1$-$C_{30})$hydrocarbyl, and a substituted or unsubstituted $(C_1$-$C_{30})$hydrocarbylene terminated with —$NR^{14}{}_2$,
$L^2$ is a substituted or unsubstituted $(C_1$-$C_{30})$hydrocarbylene, and
m2 is about 0 to about 100,000, or
a combination thereof; and
placing the composition in a subterranean formation.

Embodiment 102 provides a system comprising:
a composition comprising
an aryl component comprising at least one of an aryldicarboxylic acid, an ester thereof, a salt thereof, and an acid halide thereof; and
an amine or epoxide component comprising at least one of
a linear diepoxide, a poly(alkylamine), or a combination thereof; and
an alkoxy- or hydroxy-substituted silane comprising an epoxy group, an alkoxy- or hydroxy-substituted silane comprising an amine group, or a combination thereof; and
a subterranean formation comprising the composition therein.

Embodiment 103 provides the system of Embodiment 102, further comprising
a tubular disposed in the subterranean formation;
a pump configured to pump the composition in the subterranean formation through the tubular.

Embodiment 104 provides a composition for treatment of a subterranean formation, the composition comprising:
an aryl component comprising at least one of an aryldicarboxylic acid, an ester thereof, a salt thereof, and an acid halide thereof; and
an amine or epoxide component comprising at least one of
a linear diepoxide, a poly(alkylamine), or a combination thereof; and
an alkoxy- or hydroxy-substituted silane comprising an epoxy group, an alkoxy- or hydroxy-substituted silane comprising an amine group, or a combination thereof.

Embodiment 105 provides the composition of Embodiment 104, wherein the composition further comprises a downhole fluid.

Embodiment 106 provides a cured product of the composition of any one of Embodiments 104-105.

Embodiment 107 provides a method of preparing a composition for treatment of a subterranean formation, the method comprising:
forming a composition comprising
an aryl component comprising at least one of an aryldicarboxylic acid, an ester thereof, a salt thereof, and an acid halide thereof; and an amine or epoxide component comprising at least one of
a linear diepoxide, a poly(alkylamine), or a combination thereof; and
an alkoxy- or hydroxy-substituted silane comprising an epoxy group, an alkoxy- or hydroxy-substituted silane comprising an amine group, or a combination thereof.

Embodiment 108 provides the composition, method, or system of any one or any combination of Embodiments 1-107 optionally configured such that all elements or options recited are available to use or select from.

What is claimed is:

1. A method of treating a subterranean formation, the method comprising:
providing a composition comprising
an aryl component comprising at least one of an aryldicarboxylic acid, an ester thereof, a salt thereof, and an acid halide thereof; and
an amine or epoxide component comprising at least one of
a linear diepoxide, a poly(alkylamine), or a combination thereof; and
an alkoxy- or hydroxy-substituted silane comprising an epoxy group, an alkoxy- or hydroxy-substituted silane comprising an amine group, or a combination thereof; and
placing the composition in a subterranean formation.

2. The method of claim 1, wherein the aryldicarboxylic acid, ester thereof, salt thereof, or acid halide thereof has the following structure:

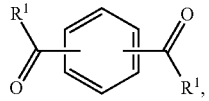

wherein $R^1$ is selected from the group consisting of —OH, —$OR^2$, —O⁻[counterion], and -halide, wherein at each occurrence $R^2$ is a substituted or unsubstituted ($C_1$-$C_{30}$) hydrocarbyl interrupted by 0, 1, 2, or 3 groups selected from —O—, substituted or unsubstituted —NH—, and —S—.

3. The method of claim 1, wherein the linear diepoxide has the following structure:

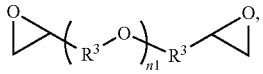

wherein
at each occurrence $R^3$ is independently a substituted or unsubstituted ($C_1$-$C_{30}$)hydrocarbylene, and
n1 is about 0 to about 100,000.

4. The method of claim 1, wherein the alkoxy- or hydroxy-substituted silane comprising the epoxy group has the following structure:

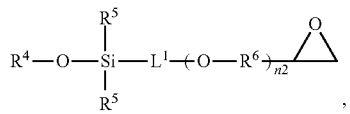

wherein
$R^4$ is independently selected from the group consisting of —H and a substituted or unsubstituted ($C_1$-$C_{30}$) hydrocarbyl interrupted by 0, 1, 2, or 3 groups independently chosen from —O— and —S—,
at each occurrence, $R^5$ is independently selected from the group consisting of a substituted or unsubstituted ($C_1$-$C_{30}$)hydrocarbyl interrupted by 0, 1, 2, or 3 groups independently chosen from —O— and —S—, and a substituted or unsubstituted ($C_1$-$C_{30}$) hydrocarbyloxy interrupted by 0, 1, 2, or 3 groups independently chosen from —O— and —S—,
at each occurrence, $R^6$ is independently a substituted or unsubstituted ($C_1$-$C_{30}$)hydrocarbylene,
$L^1$ is a substituted or unsubstituted ($C_1$-$C_{30}$)hydrocarbylene, and
n2 is about 0 to about 100,000.

5. The method of claim 1, wherein the poly(alkylamine) has the following structure:

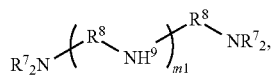

wherein
at each occurrence, $R^7$ is selected from the group consisting of —H and a substituted or unsubstituted ($C_1$-$C_{30}$)hydrocarbyl,
at each occurrence, $R^8$ is a substituted or unsubstituted ($C_1$-$C_{30}$)hydrocarbylene,
at each occurrence, $R^9$ is selected from the group consisting of —H, a substituted or unsubstituted ($C_1$-$C_{30}$)hydrocarbyl, and a substituted or unsubstituted ($C_1$-$C_{30}$)hydrocarbylene terminated with —$NR^9{}_2$, and
m1 is about 0 to about 100,000.

6. The method of claim 1, wherein the alkoxy- or hydroxy-substituted silane comprising the amine group has the following structure:

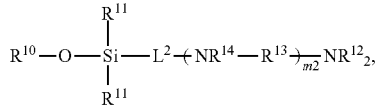

wherein
$R^{10}$ is independently selected from the group consisting of —H and a substituted or unsubstituted ($C_1$-$C_{30}$) hydrocarbyl interrupted by 0, 1, 2, or 3 groups independently chosen from —O—, substituted or unsubstituted —NH—, and —S—,
at each occurrence, $R^{11}$ is independently selected from the group consisting of a substituted or unsubstituted ($C_1$-$C_{30}$)hydrocarbyl interrupted by 0, 1, 2, or 3 groups independently chosen from —O— and —S—, and a substituted or unsubstituted ($C_1$-$C_{30}$) hydrocarbyloxy interrupted by 0, 1, 2, or 3 groups independently chosen from —O— and —S—,
$R^{12}$ is selected from the group consisting of —H and a substituted or unsubstituted ($C_1$-$C_{30}$)hydrocarbyl,
$R^{13}$ is a substituted or unsubstituted ($C_1$-$C_{30}$)hydrocarbylene,
$R^{14}$ is selected from the group consisting of —H, a substituted or unsubstituted ($C_1$-$C_{30}$)hydrocarbyl, and a substituted or unsubstituted ($C_1$-$C_{30}$)hydrocarbylene terminated with —$NR^{14}{}_2$,
$L^2$ is a substituted or unsubstituted ($C_1$-$C_{30}$)hydrocarbylene, and
m2 is about 0 to about 100,000.

7. The method of claim 1, wherein the composition comprises the aryldicarboxylic acid, salt thereof, or ester thereof and the linear diepoxide.

8. The method of claim 7, further comprising curing the composition to form a cured product comprising a repeating unit having the structure:

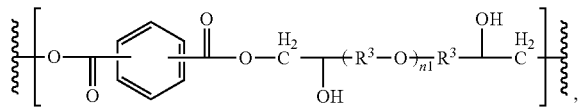

wherein
at each occurrence, $R^3$ is independently a substituted or unsubstituted $(C_1-C_{30})$hydrocarbylene, and
n1 is about 0 to about 100,000.

9. The method of claim 1, wherein the composition comprises the aryldicarboxylic acid, salt thereof, or ester thereof and the alkoxy- or hydroxy-substituted silane comprising the epoxy group.

10. The method of claim 9, further comprising curing the composition to form a cured product having the structure:

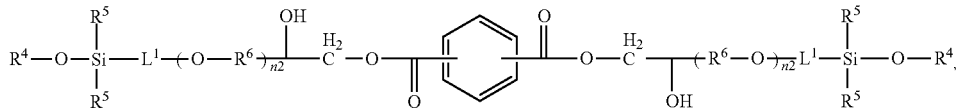

wherein
$R^4$ is independently selected from the group consisting of —H and a substituted or unsubstituted $(C_1-C_{30})$ hydrocarbyl interrupted by 0, 1, 2, or 3 groups independently chosen from —O— and —S—,
at each occurrence, $R^5$ is independently selected from the group consisting of a substituted or unsubstituted $(C_1-C_{30})$hydrocarbyl interrupted by 0, 1, 2, or 3 groups independently chosen from —O— and —S—, and a substituted or unsubstituted $(C_1-C_{30})$ hydrocarbyloxy interrupted by 0, 1, 2, or 3 groups independently chosen from —O— and —S—,
$L^1$ is a substituted or unsubstituted $(C_1-C_{30})$hydrocarbylene,
at each occurrence, $R^6$ is independently a substituted or unsubstituted $(C_1-C_{30})$hydrocarbylene, and
n2 is about 0 to about 100,000.

11. The method of claim 1, wherein the composition comprises the aryldicarboxylic acid, salt thereof, or ester thereof, the alkoxy- or hydroxy-substituted silane comprising the epoxy group, and the linear diepoxide.

12. The method of claim 11, further comprising curing the composition to form a cured product having the structure:

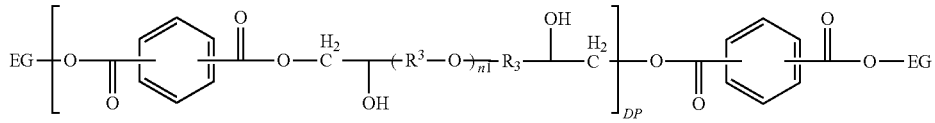

wherein
EG has the following structure:

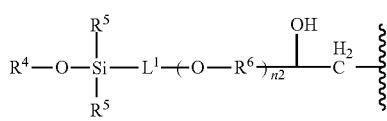

at each occurrence $R^3$ is independently a substituted or unsubstituted $(C_1-C_{30})$hydrocarbylene,
n1 is about 0 to about 100,000,
$R^4$ is independently selected from the group consisting of —H and a substituted or unsubstituted $(C_1-C_{30})$ hydrocarbyl interrupted by 0, 1, 2, or 3 groups independently chosen from —O— and —S—,
at each occurrence, $R^5$ is independently selected from the group consisting of a substituted or unsubstituted $(C_1-C_{30})$hydrocarbyl interrupted by 0, 1, 2, or 3 groups independently chosen from —O— and —S—, and a substituted or unsubstituted $(C_1-C_{30})$ hydrocarbyloxy interrupted by 0, 1, 2, or 3 groups independently chosen from —O— and —S—,
at each occurrence, $R^6$ is independently a substituted or unsubstituted $(C_1-C_{30})$hydrocarbylene, and
n2 is about 0 to about 100,000.

13. The method of claim 1, wherein the composition comprises the aryldicarboxylic acid, salt thereof, ester thereof, or acid halide thereof, and the poly(alkylamine).

14. The method of claim 13, further comprising curing the composition to form a cured product comprising a repeating unit having the structure:

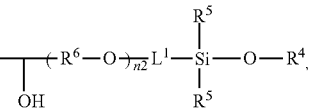

wherein
at each occurrence, $R^7$ is selected from the group consisting of —H, a substituted or unsubstituted $(C_1-C_{30})$hydrocarbyl, and —CL,
at each occurrence, $R^8$ is a substituted or unsubstituted $(C_1-C_{30})$hydrocarbylene, and
at each occurrence, $R^9$ is selected from the group consisting of —H, a substituted or unsubstituted $(C_1-C_{30})$hydrocarbyl, a substituted or unsubstituted $(C_1-C_{30})$hydrocarbylene terminated with at least one of —$NR^9{}_2$, —$NR^9CL$, and —$N(CL)_2$,
m1 is about 0 to about 100,000, and
CL is an inter- or intra-molecular bond to the non-$NR^7$-bound carbonyl group of the repeating unit.

15. The method of claim 1, wherein the composition comprises the aryldicarboxylic acid, salt thereof, ester thereof, or acid halide thereof, and the alkoxy- or hydroxy-substituted silane comprising the amine group.

16. The method of claim 15, further comprising curing the composition to form a cured product having the structure:

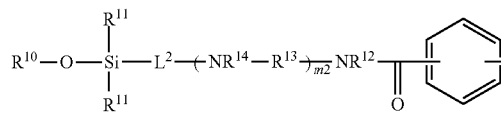 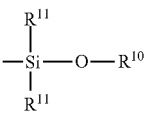

wherein
- $R^{10}$ is independently selected from the group consisting of —H and a substituted or unsubstituted $(C_1\text{-}C_{30})$ hydrocarbyl interrupted by 0, 1, 2, or 3 groups independently chosen from —O—, substituted or unsubstituted —NH—, and —S—,
- at each occurrence, $R^{11}$ is independently selected from the group consisting of a substituted or unsubstituted $(C_1\text{-}C_{30})$ hydrocarbyl interrupted by 0, 1, 2, or 3 groups independently chosen from —O— and —S—, and a substituted or unsubstituted $(C_1\text{-}C_{30})$ hydrocarbyloxy interrupted by 0, 1, 2, or 3 groups independently chosen from —O— and —S—,
- $L^2$ is a substituted or unsubstituted $(C_1\text{-}C_{30})$ hydrocarbylene,
- $R^{12}$ is selected from the group consisting of —H, a substituted or unsubstituted $(C_1\text{-}C_{30})$ hydrocarbyl, and —CL,
- $R^{13}$ is a substituted or unsubstituted $(C_1\text{-}C_{30})$ hydrocarbylene,
- $R^{14}$ is selected from the group consisting of —H, a substituted or unsubstituted $(C_1\text{-}C_{30})$ hydrocarbyl, and a substituted or unsubstituted $(C_1\text{-}C_{30})$ hydrocarbylene terminated with at least one of —$NR^{14}{}_2$, —$NR^{14}CL$, and —$N(CL)_2$,
- m2 is about 0 to about 100,000, and
- CL is an inter- or intra-molecular bond to a carbonyl group from the aryldicarboxylic acid, salt thereof, ester thereof, or acid halide thereof incorporated in the cured product.

17. The method of claim 1, wherein the composition comprises the aryldicarboxylic acid, salt thereof, ester thereof, or acid halide thereof, the alkoxy- or hydroxy-substituted silane comprising the amine group, and the linear diepoxide.

18. The method of claim 17, further comprising curing the composition to form a cured product comprising a repeating unit having the structure:

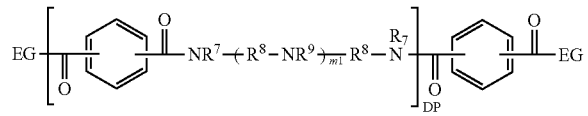

wherein
EG has the following structure:

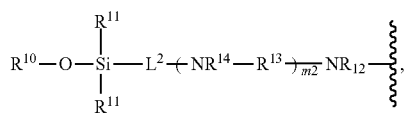

at each occurrence, $R^7$ is selected from the group consisting of —H, a substituted or unsubstituted $(C_1\text{-}C_{30})$ hydrocarbyl, and —CL,
at each occurrence, $R^8$ is a substituted or unsubstituted $(C_1\text{-}C_{30})$ hydrocarbylene,
at each occurrence, $R^9$ is selected from the group consisting of —H, a substituted or unsubstituted $(C_1\text{-}C_{30})$ hydrocarbyl, and a substituted or unsubstituted $(C_1\text{-}C_{30})$ hydrocarbylene terminated with at least one of —$NR^9{}_2$, —$NR^9CL$, and —$N(CL)_2$,
m1 is about 0 to about 100,000,
at each occurrence, $L^2$ is a substituted or unsubstituted $(C_1\text{-}C_{30})$ hydrocarbylene,
at each occurrence, $R^{10}$ is independently selected from the group consisting of —H and a substituted or unsubstituted $(C_1\text{-}C_{30})$ hydrocarbyl interrupted by 0, 1, 2, or 3 groups independently chosen from —O—, substituted or unsubstituted —NH—, and —S—,
at each occurrence, $R^{11}$ is independently selected from the group consisting of a substituted or unsubstituted $(C_1\text{-}C_{30})$ hydrocarbyl interrupted by 0, 1, 2, or 3 groups independently chosen from —O— and —S—, and a substituted or unsubstituted $(C_1\text{-}C_{30})$ hydrocarbyloxy interrupted by 0, 1, 2, or 3 groups independently chosen from —O— and —S—,
at each occurrence, $R^{12}$ is selected from the group consisting of —H, a substituted or unsubstituted $(C_1\text{-}C_{30})$ hydrocarbyl, and —CL,
at each occurrence, $R^{13}$ is independently a substituted or unsubstituted $(C_1\text{-}C_{30})$ hydrocarbylene,
$R^{14}$ is selected from the group consisting of —H, a substituted or unsubstituted $(C_1\text{-}C_{30})$ hydrocarbyl, and a substituted or unsubstituted $(C_1\text{-}C_{30})$ hydrocarbylene terminated with at least one of —$NR^{14}{}_2$, —$NR^{14}CL$, and —$N(CL)_2$,
m2 is about 0 to about 100,000, and
CL is an inter- or intra-molecular bond to a carbonyl group from the aryldicarboxylic acid, salt thereof, ester thereof, or acid halide thereof incorporated in the cured product.

19. A method of treating a subterranean formation, the method comprising:
providing a composition comprising
about 0.001 wt % to about 50 wt % of an aryl component having the following structure:

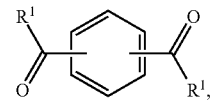

wherein $R^1$ is selected from the group consisting of —OH, —$OR^2$, —$O^-$ [counterion], and -halide, wherein at each occurrence $R^2$ is a substituted or unsubstituted $(C_1\text{-}C_{30})$ hydrocarbyl interrupted by 0, 1, 2, or 3 groups selected from —O—, substituted or unsubstituted —NH—, and —S—; and
about 0.001 wt % to about 50 wt % of an amine or epoxide component comprising at least one of A and B:
A) a linear diepoxide having the following structure:

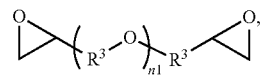

wherein
at each occurrence $R^3$ is independently a substituted or unsubstituted $(C_1\text{-}C_{30})$hydrocarbylene, and
n1 is about 0 to about 100,000,
a poly(alkylamine) having the following structure:

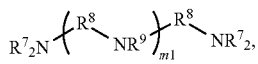

wherein
at each occurrence, $R^7$ is selected from the group consisting of —H and a substituted or unsubstituted $(C_1\text{-}C_{30})$hydrocarbyl,
at each occurrence, $R^8$ is a substituted or unsubstituted $(C_1\text{-}C_{30})$hydrocarbylene,
at each occurrence, $R^9$ is selected from the group consisting of —H, a substituted or unsubstituted $(C_1\text{-}C_{30})$hydrocarbyl, and a substituted or unsubstituted $(C_1\text{-}C_{30})$hydrocarbylene terminated with —$NR^9{}_2$, and
m1 is about 0 to about 100,000, or
a combination thereof;
B) an alkoxy- or hydroxy-substituted silane comprising an epoxy group having the structure:

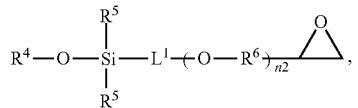

wherein
$R^4$ is independently selected from the group consisting of —H and a substituted or unsubstituted $(C_1\text{-}C_{30})$hydrocarbyl interrupted by 0, 1, 2, or 3 groups independently chosen from —O— and —S—,
at each occurrence, $R^5$ is independently selected from the group consisting of a substituted or unsubstituted $(C_1\text{-}C_{30})$hydrocarbyl interrupted by 0, 1, 2, or 3 groups independently chosen from —O— and —S—, and a substituted or unsubstituted $(C_1\text{-}C_{30})$hydrocarbyloxy interrupted by 0, 1, 2, or 3 groups independently chosen from —O— and —S—,
at each occurrence, $R^6$ is independently a substituted or unsubstituted $(C_1\text{-}C_{30})$hydrocarbylene,
$L^1$ is a substituted or unsubstituted $(C_1\text{-}C_{30})$hydrocarbylene, and n2 is about 0 to about 100,000,
an alkoxy- or hydroxy-substituted silane comprising an amine group having the structure:

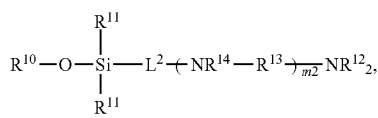

wherein
$R^{10}$ is independently selected from the group consisting of —H and a substituted or unsubstituted $(C_1\text{-}C_{30})$hydrocarbyl interrupted by 0, 1, 2, or 3 groups independently chosen from —O—, substituted or unsubstituted —NH—, and —S—,
at each occurrence, $R^{11}$ is independently selected from the group consisting of a substituted or unsubstituted $(C_1\text{-}C_{30})$hydrocarbyl interrupted by 0, 1, 2, or 3 groups independently chosen from —O— and —S—, and a substituted or unsubstituted $(C_1\text{-}C_{30})$hydrocarbyloxy interrupted by 0, 1, 2, or 3 groups independently chosen from —O— and —S—,
$R^{12}$ is selected from the group consisting of —H and a substituted or unsubstituted $(C_1\text{-}C_{30})$hydrocarbyl,
$R^{13}$ is a substituted or unsubstituted $(C_1\text{-}C_{30})$ hydrocarbylene,
$R^{14}$ is selected from the group consisting of —H, a substituted or unsubstituted $(C_1\text{-}C_{30})$hydrocarbyl, and a substituted or unsubstituted $(C_1\text{-}C_{30})$hydrocarbylene terminated with —$NR^{14}{}_2$,
$L^2$ is a substituted or unsubstituted $(C_1\text{-}C_{30})$hydrocarbylene, and
m2 is about 0 to about 100,000, or
a combination thereof; and
placing the composition in a subterranean formation.

* * * * *